(12) United States Patent
Lee

(10) Patent No.: US 10,706,774 B2
(45) Date of Patent: Jul. 7, 2020

(54) IMAGE DISPLAY APPARATUS

(71) Applicant: LG ELECTRONICS INC., Seoul (KR)

(72) Inventor: Kyungryun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 28 days.

(21) Appl. No.: 15/998,774

(22) Filed: Aug. 17, 2018

(65) Prior Publication Data

US 2019/0057652 A1 Feb. 21, 2019

(30) Foreign Application Priority Data

Aug. 17, 2017 (KR) .................. 10-2017-0104327

(51) Int. Cl.
  *G09G 3/3233* (2016.01)
  *H04N 5/57* (2006.01)
  (Continued)

(52) U.S. Cl.
  CPC ......... *G09G 3/3233* (2013.01); *G09G 3/2003* (2013.01); *G09G 3/2096* (2013.01);
  (Continued)

(58) Field of Classification Search
  CPC .. G09G 3/2003; G09G 3/2096; G09G 3/3233; G09G 2300/0842; G09G 2310/08; G09G 2320/0233; G09G 2320/0257; G09G 2320/029; G09G 2320/046; G09G 2320/0686; G09G 2320/10; G09G 2340/06; G09G 2354/00; G09G 2370/02; G09G 2370/16; G09G 3/3266; G09G 3/3275;
  (Continued)

(56) References Cited

U.S. PATENT DOCUMENTS

2009/0256907 A1* 10/2009 Faragher ................ H04N 17/02
                                                             348/143
2014/0375704 A1* 12/2014 Bi ........................ G09G 3/3275
                                                             345/694
(Continued)

FOREIGN PATENT DOCUMENTS

| KR | 10-2016-0071885 | 6/2016 |
| KR | 10-2016-0071886 | 6/2016 |
| KR | 10-2016-0092537 | 8/2016 |

OTHER PUBLICATIONS

International Search Report dated Dec. 17, 2018 issued in Application No. PCT/KR2018/009384.

*Primary Examiner* — Nelson M Rosario
(74) *Attorney, Agent, or Firm* — KED & Associates, LLP

(57) ABSTRACT

The present invention relates to an image display apparatus. The image display apparatus according to an embodiment of the present invention includes a display having an organic light-emitting diode (OLED) panel, and a controller to control the display, wherein in response to an input image being a video, when variation a variation in a level of color information of a first pixel data corresponding to a first pixel in the input image is within a predetermined range, and a level of brightness information of the first pixel data is equal to or higher than a first level, the controller detects the first pixel as a pixel in a static area, and decreases the level of brightness of the first pixel data.

20 Claims, 23 Drawing Sheets

(51) Int. Cl.
*G09G 3/20* (2006.01)
*H04N 5/445* (2011.01)
*H04N 5/20* (2006.01)
G09G 3/3266 (2016.01)
G09G 3/3275 (2016.01)

(52) U.S. Cl.
CPC ........... *H04N 5/20* (2013.01); *H04N 5/44591* (2013.01); *H04N 5/57* (2013.01); *G09G 3/3266* (2013.01); *G09G 3/3275* (2013.01); *G09G 2300/0842* (2013.01); *G09G 2310/08* (2013.01); *G09G 2320/029* (2013.01); *G09G 2320/0233* (2013.01); *G09G 2320/0257* (2013.01); *G09G 2320/046* (2013.01); *G09G 2320/0686* (2013.01); *G09G 2320/10* (2013.01); *G09G 2340/06* (2013.01); *G09G 2354/00* (2013.01); *G09G 2370/02* (2013.01); *G09G 2370/16* (2013.01); *H04N 2005/44547* (2013.01)

(58) Field of Classification Search
CPC ........ H04N 5/20; H04N 5/44591; H04N 5/57; H04N 2005/44547
See application file for complete search history.

(56) References Cited

U.S. PATENT DOCUMENTS

| | | | |
|---|---|---|---|
| 2015/0062197 A1* | 3/2015 | Jung | G09G 3/2003 345/690 |
| 2016/0217731 A1 | 7/2016 | Joo et al. | |
| 2016/0351115 A1 | 12/2016 | Bang | |

* cited by examiner (a)

(b)

IMAGE DISPLAY APPARATUS

CROSS-REFERENCE TO RELATED APPLICATION

This application claims the priority benefit of Korean Patent Application No. 10-2017-0104327, filed on Aug. 17, 2017 in the Korean Intellectual Property Office, the disclosure of which is incorporated herein by reference.

BACKGROUND OF THE INVENTION

1. Field of the Invention

The present invention relates to an image display apparatus, and more particularly, to an image display apparatus including an organic light-emitting diode (OLED) panel, in which a static area in a video may be correctly detected.

2. Description of the Related Art

Image display apparatuses function to display images that can be viewed by users. Users may view various images through the image display apparatuses.

Particularly, the image display apparatus may display broadcast videos. The image display apparatus may display a broadcast video selected by a user from among broadcast signals transmitted from broadcasting stations, and the selected broadcast video may be displayed on a display.

The image display apparatus may display images by using any one of various types of panels, in which an organic light-emitting diode (OLED) panel having a fast response speed and ensuring a sharp image is increasingly adopted for the image display apparatus recently.

However, due to the characteristics of the OLED panel, a burn-in phenomenon occurs. Particularly, a logo included in a broadcast video increases the possibility of the occurrence of the burn-in phenomenon in a logo displaying area. For this reason, there is research to reduce the burn-in phenomenon caused by the logo area and the like.

SUMMARY OF THE INVENTION

It is an object of the present invention to provide an image display apparatus having an organic light-emitting diode (OLED) panel, in which the image display apparatus may correctly detect a static area in a video.

It is another object of the present invention to provide an image display apparatus having an organic light-emitting diode (OLED) panel, in which upon correctly detecting a static area in a video, the image display apparatus may change the brightness of the static area, thereby extending the life of the image display apparatus.

In accordance with an aspect of the present invention, the above and other objects can be accomplished by the provision of an image display apparatus including a display having an organic light-emitting diode (OLED) panel, and a controller to control the display, wherein in response to an input image being a video, when a variation in a level of color information of a first pixel data corresponding to a first pixel in the input image is within a predetermined range, and a level of brightness information of the first pixel data is equal to or higher than a first level, the controller detects the first pixel as a pixel in a static area, and decreases the level of brightness of the first pixel data.

Further, in accordance with another aspect of the present invention, the above and other objects can be accomplished by the provision of an image display apparatus including: a display having an organic light-emitting diode (OLED) panel, and a controller to control the display, wherein when an input image is a video, the controller determines whether a first pixel is a pixel in a static area based on color information and brightness information of first pixel data corresponding to the first pixel in the input image, and when the first pixel is the pixel in the static area, the controller decreases a brightness level of the assigned first pixel data.

DETAILED DESCRIPTION OF THE PREFERRED EMBODIMENTS

Hereinafter, the present invention will be described in further detail with reference to the accompanying drawings.

In the following description of the present invention, the suffixes "module" and "unit" that are mentioned the elements used to describe the present invention are merely used for the purpose of simplifying the description of the present invention, and thus the suffix itself is assigned a particularly significant meaning or function. Therefore, the suffixes "module" and "unit" may also re alternately used to refer to a specific element of the present invention.

Figure 1:
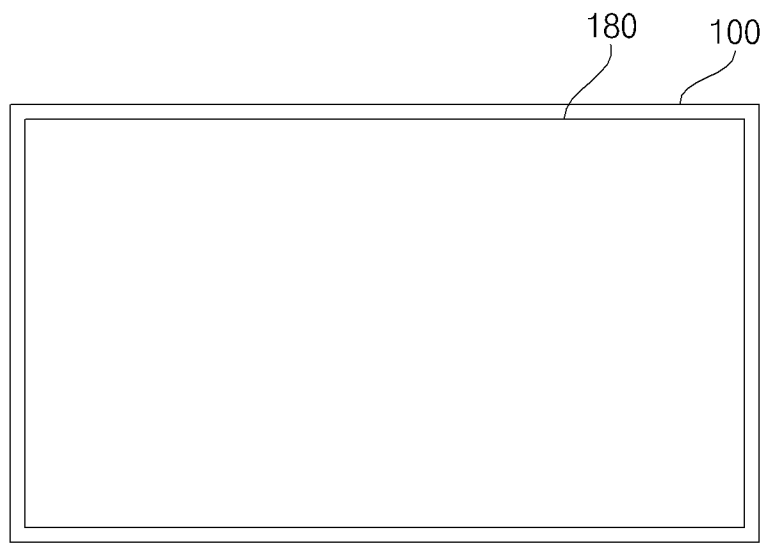
FIG. 1 is a diagram illustrating an image display apparatus according to an embodiment of the present invention.

FIG. 1 is a diagram illustrating an image display apparatus according to an embodiment of the present invention.

Referring to FIG. 1, the image display apparatus 100 includes a display 180.

The display 180 may be implemented as any one of various panels. For example, the display 180 may be any one of a liquid crystal display (LCD) panel, an organic light-emitting diode (OLED) panel, an inorganic light-emitting display (LED) panel, and the like.

In the present disclosure, the display 180 includes an organic light-emitting diode (OLED) panel, and in order to reduce a burn-in phenomenon that may occur in the OLED panel, the present invention provides a method of correctly detecting a static area which is a main cause of the burn-in phenomenon. Further, the present invention provides a method of extending the life of the image display apparatus by correctly detecting the static area.

In accordance with an embodiment of the present invention, the image display apparatus 100 includes a display 180 having an organic light-emitting diode (OLED) panel 210, and a controller 170 which controls the display 180. In the case where an input image is a video, a variation in a level of color information of a first pixel data corresponding to a first pixel in the input image is within a predetermined range, and a level of brightness information of the first pixel data is equal to or higher than a first level, the controller 170 detects the first pixel as a pixel in a static area, and reduces the brightness level of the first pixel data. Accordingly, the static area may be correctly detected at the image display apparatus 100.

Upon correctly detecting the static area in the video at the image display apparatus 100, the controller 170 changes the brightness of the static area, thereby reducing the burn-in phenomenon in the static area, and extending the life of the image display apparatus 100.

In the case where a brightness difference between the detected static area and a surrounding area of the static area becomes larger, the controller 170 may control the brightness level of the detected static area to be further lowered, such that the burn-in phenomenon of the static area in the video may be further reduced.

As the brightness level of the surrounding area of the static area becomes higher, the controller 170 may control a variation in the brightness level to be smaller, so that the brightness difference between the static area and the surrounding area of the static area may become smaller, thereby maintaining visibility of the static area.

Further, the controller 170 may receive information on the static area in the video from an external server or an external device, and may detect a pixel in the static area by further using the received information, such that the static area may be detected more correctly.

The image display apparatus 100 according to another embodiment of the present invention includes a display 180 having an organic light-emitting diode (OLED) panel 210, and a controller 170 which controls the display 180. In the case where an input image is a video, the controller 170 determines whether a first pixel is a pixel in a static area based on color information and brightness information of first pixel data corresponding to the first pixel in the input image, and in the case where the first pixel is the pixel in the static area, the controller 170 controls the brightness level of the assigned first pixel data to decrease, thereby enabling correct detection of the static area in the video at the image display apparatus 100.

Upon correctly detecting the static area in the video at the image display apparatus 100, the controller 170 changes the brightness of the static area, thereby reducing the burn-in phenomenon in the static area, and extending the life of the image display apparatus 100.

Various methods of operating the above-described image display apparatus 100 will be described in further detail with reference to FIG. 9 and the following figures.

The image display apparatus 100 of FIG. 1 may be a monitor, a TV, a tablet PC, a mobile terminal, and the like.

Figure 2:
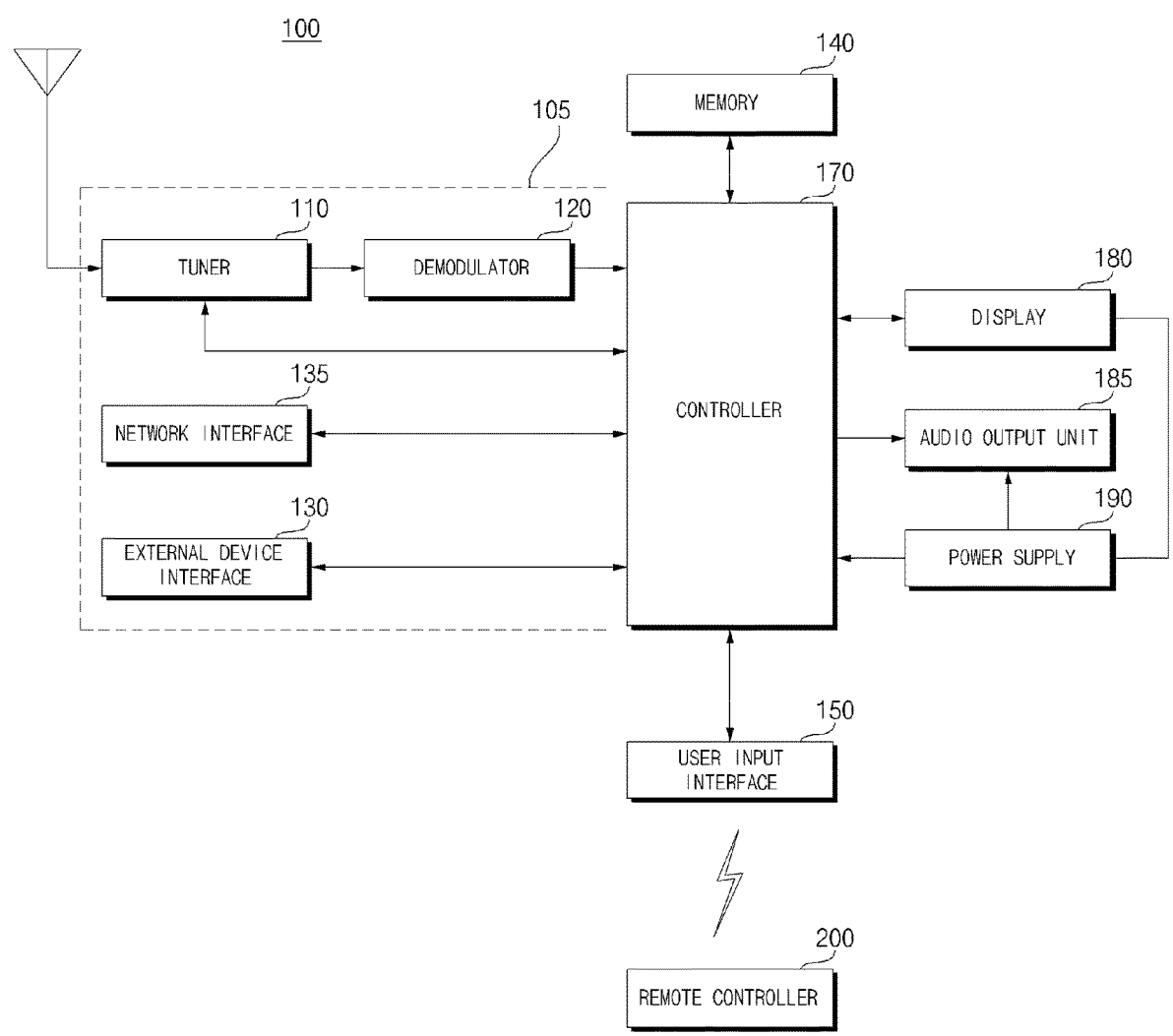
FIG. 2 is an internal block diagram of the image display apparatus of FIG. 1.

FIG. 2 is an internal block diagram of the image display apparatus of FIG. 1.

Referring to FIG. 2, the image display apparatus 100 includes a broadcast receiver 105, an external device interface 130, a memory 140, a user input interface 150, a sensor unit (not shown), a controller 170, a display 180, an audio output unit 185.

The broadcast receiver 105 may include a tuner 110, a demodulator 120, an external device interface 130, and a network interface 135.

Unlike FIG. 2, the broadcast receiver 105 may include only the tuner 110, the demodulator 120, and the external device interface 130 without the network interface 135.

The tuner 110 may tune a Radio Frequency (RF) broadcast signal corresponding to a channel selected by a user or all the previously stored channels, among RF broadcast signals received via an antenna (not shown). Further, the tuned RF broadcast signal is converted into an intermediate frequency signal or a baseband image, or an audio signal.

For example, if the tuned RF broadcast signal is a digital broadcast signal, the tuner 110 converts the digital broadcast signal into a digital IF signal (DIF), and if the tuned RF broadcast signal is an analog broadcast signal, the tuner 110 converts the analog broadcast signal into a baseband image or a voice signal (CVBS/SIF). That is, the tuner 110 may process the digital broadcast signal or the analog broadcast signal. The analog baseband image or the voice signal (CVBS/SIF), which is output from the tuner 110, may be directly input to the controller 170.

The tuner 110 may include a plurality of tuners to receive broadcast signals of a plurality of channels. Alternatively, the tuner 110 may be a single turner which receives broadcast signals of a plurality of channels simultaneously.

The demodulator 120 may receive the digital IF (DIF) signal converted by the tuner 110, and may demodulate the digital IF signal.

The demodulator 120 may output a stream signal (TS) after demodulation and channel decoding. Here, the stream signal TS may be a signal in which a video signal, an audio signal, and a data signal are multiplexed.

The stream signal output by the demodulator 120 may be input to the controller 170. The controller 170 may perform demultiplexing, A/V signal processing, and the like, may output video to the display 180, and may output audio to the audio output unit 185.

The external device interface 130 may be connected to an external device (not shown), for example, a set-top box 50, to transmit or receive data. To this end, the external device interface 130 may include an A/V input/output unit (not shown).

The external device interface 130 may be connected, wirelessly or by wire, to an external device, such as a digital versatile disk (DVD), a Blu-ray, a game console, a camera, a camcorder, a computer (laptop computer), a set-top box, and the like, and may perform an input/output operation with respect to the external device.

The A/V input/output unit may receive input of image and audio signals of the external device. A wireless communication unit may perform short-range wireless communication with other electronic devices.

By connection with such wireless communication unit (not shown), the external device interface 130 may exchange data with an adjacent mobile terminal 160. Particularly, the external device interface 130 may receive, from the mobile terminal 600, information on a device, an executed application, an application image, and the like.

The network interface 135 serves as an interface for connecting the image display apparatus 100 and a wired or wireless network such as the Internet. For example, the network interface 135 may receive contents or data from the Internet, a content provider, or a network operator over a network.

The network interface 135 may include a wireless communication unit (not shown).

The memory 140 may store programs for processing and controlling of each signal by the controller 170, or may store processed video, audio, or data signals.

In addition, the memory 140 may temporarily store video, audio, or data signals input via the external device interface 130. Further, the memory 140 may store information related to a predetermined broadcast channel using a channel memory function of a channel map and the like.

FIG. 2 illustrates an example where the memory 140 is provided separately from the controller 170, but the present invention is not limited thereto, and the memory 140 may be included in the controller 170.

The user input interface 150 may transmit a signal input by a user to the controller 170 or may transmit a signal from the controller 170 to the user.

For example, the user input interface 150 may transmit/receive a user input signal, such as a power on/off, a channel selection, a screen setting, and the like, from the remote controller 200, may transfer a user input signal, which is input from a local key (not shown), such as a power key, a channel key, a volume key, or a setting key, to the controller 170, may transfer a user input signal, which is input from a sensor unit (not shown) for sensing a user's gesture, to the controller 170, or may transmit a signal from the controller 170 to the sensor unit (not shown).

The controller 170 may demultiplex stream, which is input via the tuner 110, the demodulator 120, the network interface 135, or the external interface 130, or may process the demultiplexed signals, to generate and output signals for outputting video or audio.

The video signal processed by the controller 170 may be input to the display 180 to be output as a video corresponding to the video signal. Further, the video signal processed by the controller 170 may be input to an external output device via the external device interface 130.

The audio signal processed by the controller 170 may be output to the audio output unit 185. Further, the audio signal processed by the controller 170 may be input to the external output device through the external device interface 130.

Although not illustrated in FIG. 2, the controller 10 may include a demultiplexer, a video processor, and the like, which will be illustrated with reference to FIG. 3.

In addition, the controller 170 may control the overall operation of the image display apparatus 100. For example, the controller 170 may control the tuner 110 to tune an RF broadcast corresponding to a user-selected channel or a pre-stored channel.

Further, the controller 170 may control the image display apparatus 100 by a user command input via the user input interface 150 or an internal program.

For example, the controller 170 may control the display 180 to display an image. For example, the image displayed on the display 180 may be a still image or a video, or a 2D or 3D image.

The controller 170 may control a predetermined object to be displayed in the image displayed on the display 180. For example, the object may be at least one of an accessed web screen (newspaper, journal, etc.), an Electronic Program Guide (EPG), various menus, a widget, an icon, a still image, a video, and text.

The controller 170 may recognize a user's location based on an image captured by a capturing unit (not shown). For example, the controller 170 may recognize a distance (z-axial coordinates) between the user and the image display apparatus 100. Also, the controller 170 may recognize x-axial coordinates and y-axial coordinates in the display 180 corresponding to the user's location.

The display 180 may generate a driving signal by converting a video signal, a data signal, an OSD signal, and a control signal, which are processed by the controller, or a video signal, a data signal, and a control signal which are received via the external device interface 130.

The display 180 may be implemented as a touch screen to be used as an input device as well as an output device.

The audio output unit 185 may output sound by receiving an audio signal processed by the controller 170.

The capturing unit (not shown) captures a user's image. The capturing unit (not shown) may be implemented with a single camera, but is not limited thereto, and may be implemented with a plurality of cameras. The image information captured by the capturing unit (not shown) may be input to the controller 170.

The controller 170 may sense a user's gesture based on the image captured by the capturing unit (not shown), a signal sensed by the sensor unit (not shown), or a combination thereof.

The power supply 190 may supply power throughout the image display apparatus 100. Particularly, the power supply 190 may supply power to the controller 170 which may be implemented in the form of a system on chip (SOC), the display 180 to display a video, and the audio output unit 185 to output an audio.

Specifically, the power supply 190 may include a converter which converts an alternating current into a direct current, and a dc/dc converter which converts the level of the direct current.

The remote controller 200 transmits a user input to the user input interface 150. To this end, the remote controller 200 may use various communication techniques, such as Bluetooth, RF communication, IR communication, Ultra Wideband (UWB), ZigBee, and the like. Further, the remote controller 200 may receive a video, audio, or data signal output from the user input interface 150, to display the signal on the remote controller 200 or output the signal thereon in the form of sound.

The above-described image display apparatus 100 may be a fixed or mobile digital broadcast receiver capable of receiving digital broadcast.

The block diagram of the image display apparatus 100 illustrated in FIG. 2 is only by example. Depending upon the specifications of the image display apparatus 100 in actual implementation, the components of the image display apparatus 100 may be combined or omitted or new components may be added. That is, two or more components may be incorporated into one component or one component may be configured as separate components, as needed. In addition, the function of each block is described for the purpose of describing the embodiment of the invention and thus specific operations or devices should not be construed as limiting the scope and spirit of the invention.

Figure 3:
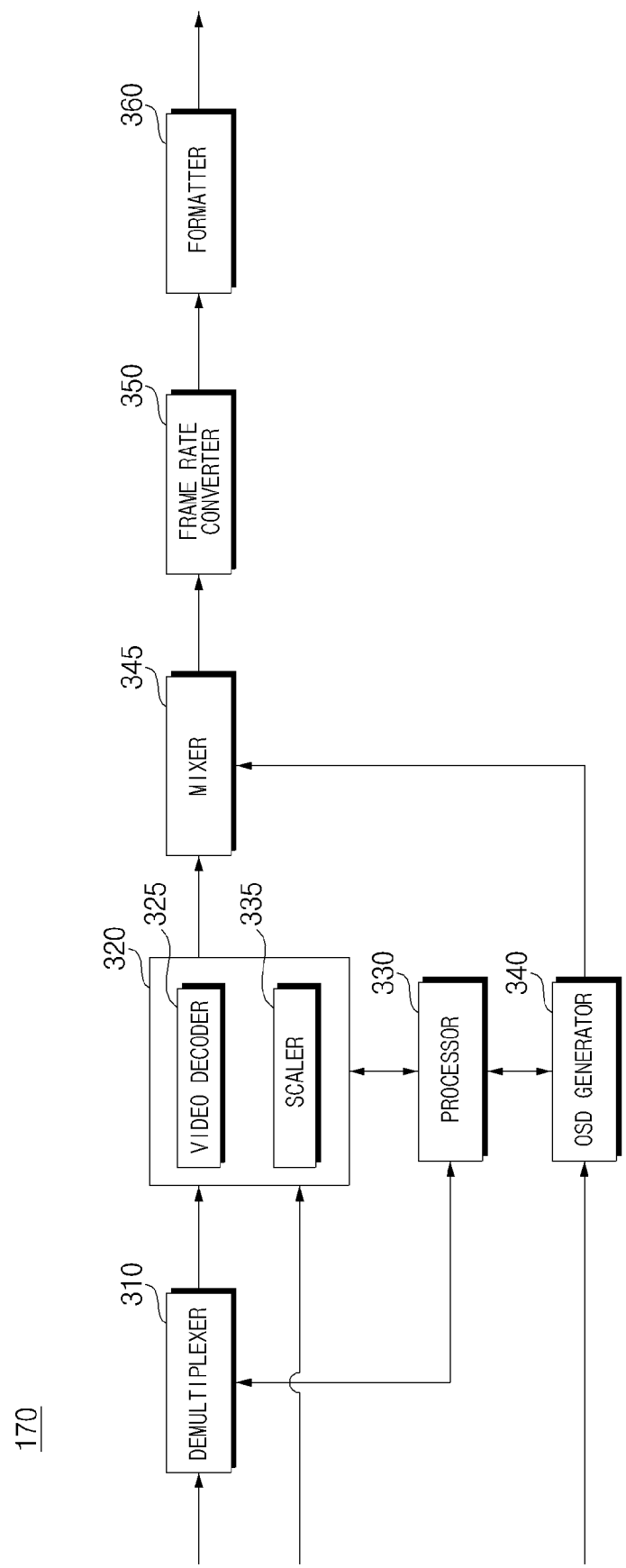
FIG. 3 is an internal block diagram of a controller of FIG. 2.

FIG. 3 is an internal block diagram of a controller of FIG. 2.

Referring to FIG. 3, the controller 170 according to an embodiment of the present invention includes a demultiplexer 310, a video processor 320, a processor 330, an OSD generator 340, a mixer 345, a frame rate converter 350, a formatter 360, and an audio processor 370. In addition, the processor 170 may further include an audio processor 370 and a data processor (not shown).

The demultiplexer 310 demultiplexes an input stream. For example, the demultiplexer 310 may demultiplex an MPEG-2 TS into a video signal, an audio signal, and a data signal. The stream signal input to the demultiplexer 310 may be a stream signal output from the tuner 110, the demodulator 120, or the external device interface 130.

The video processor 320 may process the demultiplexed video signal. To this end, the video processor 320 may include a video decoder 325 and a scaler 335.

The video decoder 325 decodes the demultiplexed video signal, and the scaler 335 scales resolution of the decoded video signal so that the video signal may be displayed on the display 180.

The video decoder 325 may include decoders of various standards. Examples of the video decoder 325 may include an MPEG-2 decoder, an H.264 decoder, a 3D image decoder for decoding a color image and a depth image, a decoder for decoding an image having a plurality of viewpoints, and the like.

The processor 330 may control the overall operation of the image display apparatus 100 or the controller 170. For example, the processor 330 controls the tuner 110 to tune an RF signal corresponding to a channel selected by the user or a previously stored channel.

The processor 330 may control the image display apparatus 100 by a user command input through the user input interface 150 or an internal program.

Further, the processor 330 may control data transmission of the network interface 135 or the external device interface 130.

In addition, the processor 330 may control the operation of the demultiplexer 310, the video processor 320, the OSD generator 340, and the like, of the controller 170.

The OSD generator 340 generates an OSD signal autonomously or according to user input. For example, the OSD generator 340 may generate signals by which various types of information are displayed as graphics or text on the display 180 according to a user input signal. The generated OSD signal may include various data such as a User Interface (UI), various menus, widgets, icons, etc, as well as a 2D object or a 3D object.

Further, the OSD generator 340 may generate a pointer which can be displayed on the display according to a pointing signal input from the remote controller 200. Particularly, such pointer may be generated by a pointing signal processor, and the OSD generator 340 may include such pointing signal processor (not shown). Alternatively, the pointing signal processor (not shown) may be provided separately from the OSD generator 340 without being included in the OSD generator 340.

The mixer 345 may mix the OSD signal generated by the OSD generator 340 and the decoded video signal processed by the video processor 320. The mixed video signal may be provided to the frame rate converter 350.

The frame rate converter (FRC) 350 may convert a frame rate of an input video. The frame rate converter 350 may output the input video as it is without converting the frame rate.

The formatter 360 may convert the format of an input video signal into a video signal suitable for the display 180.

The formatter 360 may convert the format of a video signal. For example, the formatter 360 may convert the format a 3D image signal into any one of various 3D formats, such as a side-by-side format, a top-down format, a frame sequential format, an interlaced format, a checker box format, and the like.

The audio processor (not shown) in the controller 170 may process the demultiplexed audio signal. To this end, the audio processor 370 may include various decoders.

Further, the audio processor 370 may also adjust the bass, treble, or volume of the audio signal.

A data processor (not shown) in the controller 170 may process the demultiplexed data signal. For example, when the demultiplexed data signal is encoded, the data processor may decode the encoded demultiplexed data signal. Here, the encoded data signal may be Electronic Program Guide (EPG) information including broadcast information such as the start time and end time of a broadcast program which is broadcast through each channel.

The block diagram of the controller 170 illustrated in FIG. 3 is by example. The components of the block diagrams may be integrated or omitted, or a new component may be added according to the specifications of the controller 170.

Particularly, the frame rate converter 350 and the formatter 360 may not be included in the controller 170 but may be provided individually, or may be provided separately as one module.

Figure 4A:
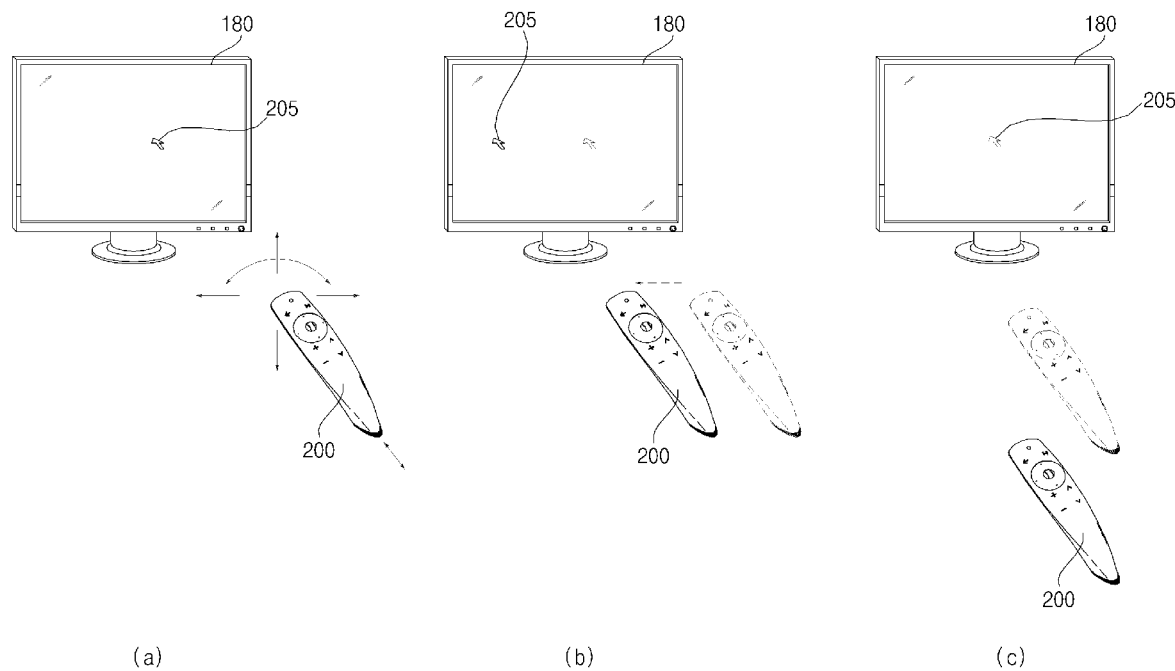
FIG. 4A is a diagram illustrating a method of controlling a remote controller of FIG. 2.

FIG. 4A is a diagram illustrating a method of controlling the remote controller of FIG. 2.

As illustrated in (a) of FIG. 4A, a pointer 205 corresponding to the remote controller 200 is displayed on the display 180.

A user may move or turn the remote controller 200 vertically and horizontally ((b) of FIG. 4), and back and forth ((c) of FIG. 4). The pointer 205 displayed on the display 180 of the image display apparatus moves corresponding to the motion of the remote controller 200. As illustrated in FIG. 4, since the pointer 205 moves according to the motion of the remote controller 200 in a 3D space, the remote controller 200 may be referred to as a space remote controller or 3D pointing device.

As illustrated in (b) of FIG. 4A, when a user moves the remote controller 200 to the left, the pointer 205 displayed in the display 180 of the image display apparatus also moves to the left corresponding to the movement.

Information on the motion of the remote controller 200, which is sensed by a sensor thereof, is transmitted to the image display apparatus. The image display apparatus may calculate coordinates of the pointer 205 based on the information on the motion of the remote controller 200. The image display apparatus may display the pointer 205 to correspond to the calculated coordinates thereof.

As illustrated in (c) of FIG. 4A, while pressing a specific button of the remote controller 200, a user may move the remote controller 200 away from the display 180. Accordingly, a selected area of the display 180 corresponding to the pointer 205 is zoomed in and enlarged. By contrast, when the user moves the remote controller 200 toward the display 180, the selected area of the display 180 corresponding to the pointer 205 is zoomed out and may be reduced in size. Further, when the remote controller 200 moves away from the display 180, the selected area may be zoomed out, whereas when the remote controller 200 moves toward the display 180, the selected area may be zoomed in.

Alternatively, while a specific button of the remote controller 200 is pressed, the horizontal and vertical movement of the remote controller 200 may not be recognized. That is, when the remote controller 200 moves away or toward the display 180, the vertical or horizontal movement is not recognized, and only the back and forth movement is recognized. When the specific button of the remote controller 200 is not pressed, only the pointer 205 is moved according to the up and down and left and right movement of the remote controller 200.

The moving speed or moving direction of the pointer 205 may correspond to the moving speed or moving direction of the remote controller 200.

Figure 4B:
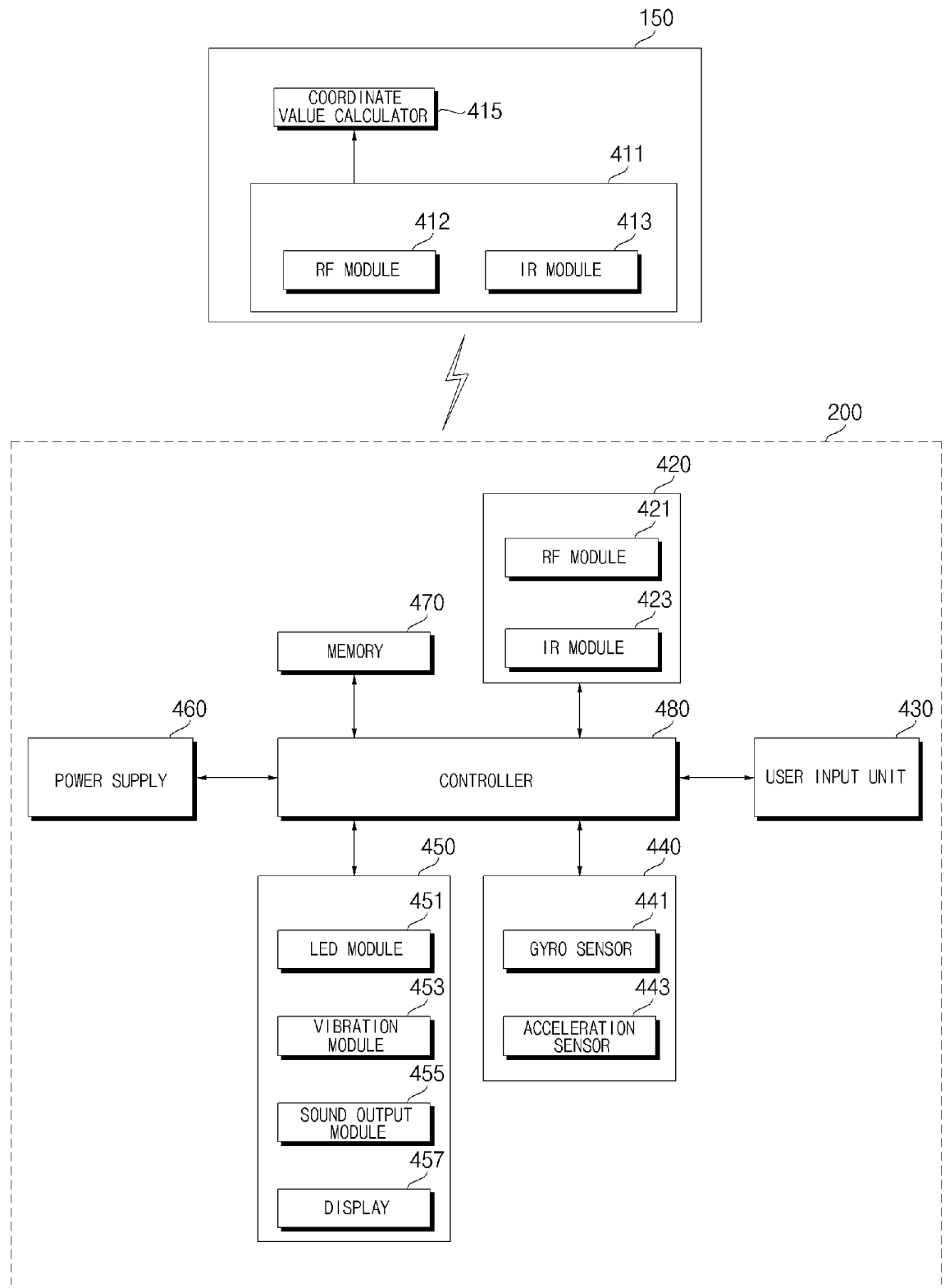
FIG. 4B is an internal block diagram of a remote controller of FIG. 2.

FIG. 4B is an internal block diagram of a remote controller of FIG. 2.

Referring to FIG. 4B, the remote controller 200 includes a wireless communication unit 425, a user input unit 430, a sensor unit 440, an output unit 450, a power supply 460, a memory 470, and a controller 480.

The wireless communication unit 425 transmits and receives signals to and from any one of the image display apparatuses according to the above-described embodiments of the present invention. Description below will be made based on any one of the image display apparatuses 100 according to the embodiments of the present invention.

In the embodiment, the remote controller 200 may include an RF module 421 for transmitting and receiving signals to and from the image display apparatus 100 according to the RF communication standards. Further, the remote controller 200 may include an IF module 423 for transmitting and receiving signals to and from the image display apparatus 100 according to the IR communication standards.

In the embodiment, the remote controller 200 may transmit signals, including information on movement and the like of the remote controller 200, to the image display apparatus 100 through the RF module 421.

Further, the remote controller 200 may receive signals, transmitted by the image display apparatus 100, through the RF module 421. Also, if necessary, the remote controller 200 may transmit commands, including power on/off, channel change, volume change, and the like, to the image display apparatus 100 through the IR module 423.

The user input unit 430 may be composed of a keypad, a button, a touch pad, a touch screen, and the like. A user may operate the user input unit 430 to input commands related to the image display apparatus 100 to the remote control apparatus 200. In the case where the user input unit 430 includes a hard key button, a user may input commands related to the image display apparatus 100 to the remote controller 200 by pushing the hard key button. In the case where the user input unit 430 includes a touch screen, the user may input commands related to the image display apparatus 100 to the remote control apparatus 200 by touching a soft key of the touch screen. Further, the user input unit 430 may include various types of input units, such as a scroll key, a jog key, and the like, which may be manipulated by a user, but the present invention is not limited to this embodiment.

The sensor unit 440 may include a gyro sensor 441 or an acceleration sensor 443. The gyro sensor 441 may sense information on movement of the remote controller 200.

For example, the gyro sensor 441 may sense information on the operation of the remote control apparatus 200 based on x, y, and z axes. The acceleration sensor 443 may sense information on a moving speed and the like of the remote controller 200. Moreover, the sensor unit 440 may further include a distance measurement sensor to sense a distance with respect to the display 180.

The output unit 450 may output video or audio signals corresponding to the manipulation of the user input unit 430 or to signals transmitted by the image display apparatus 100. A user may recognize, through the output unit 450, whether the user input unit 430 is manipulated or the image display apparatus 100 is controlled.

For example, in order to indicate when the user input unit 430 is manipulated or a signal is transmitted and received with the image display apparatus 100 through the wireless communication unit 425, the output unit 450 may include an LED module 451 which flashes, a vibration module 453 which generates vibration, a sound output module 455 which outputs sound, or a display 457 which outputs a video.

The power supply 460 supplies power to the remote controller 200. In the case where the remote controller 200 does not move for a predetermined period of time, the power supply 460 stops supplying power to reduce waste of power. The power supply 460 may resume power supply when a predetermined key provided for the remote controller 200 is manipulated.

The memory 470 may store various types of programs, application data, and the like, which are necessary to control or operate the remote control apparatus 200. When the remote control apparatus 200 transmits and receives signals wirelessly through the image display apparatus 100 and the RF module 421, the remote controller 200 and the image display apparatus 100 transmit and receive signals through a predetermined frequency band. The controller 480 of the remote controller 200 may store information related to a frequency band and the like in the memory 470 for wirelessly transmitting and receiving signals with the image display apparatus 100 which is paired with the remote controller 200, and may refer to the stored information.

The controller 480 controls the general operation related to the control of the remote controller 200. The controller 480 may transmit a signal corresponding to a predetermined key manipulation of the user input unit 430, or a signal corresponding to movement of the remote controller 200 which is sensed by the sensor unit 440, to the image display apparatus 100 through the wireless communication unit 425.

The user input interface unit 150 of the image display apparatus 100 may include a wireless communication unit 151 which may wirelessly transmit and receive signals with the remote controller 200, and a coordinate value calculator 415 which may calculate coordinates of a pointer corresponding to the operation of the remote controller 200.

The user input interface 150 may wirelessly transmit and receive signals with the remote controller 200 through the RF module 421. Further, the remote controller 200 may receive signals, transmitted through the IR communication standards, through the IR module 413.

The coordinate value calculator 415 may calculate coordinate values (x and y) of the pointer 205 to be displayed on the display 180 by correcting hand trembling or an error based on a signal corresponding to the motion of the remote controller 200 which is received through the wireless communication unit 151.

A signal, which is transmitted from the remote controller 200 and is input to the image display apparatus 100, is transmitted to the controller 170 of the image display apparatus 100 through the user input interface 150. Based on the signal transmitted from the remote controller 200, the controller 170 identifies information on the motion and key manipulation of the remote controller 200, and may control the image display apparatus 100 based on the information.

In another example, the remote controller 200 may calculate coordinate values of the pointer corresponding to the motion, and may output the calculated coordinate values to the user input interface 150 of the image display apparatus 100. In this case, the user input interface 150 of the image display apparatus 100 may transmit information on the received coordinate values of the pointer to the controller 170 without separately correcting hand trembling or an error.

Further, in yet another example, unlike FIG. 4B, the coordinate value calculator 415 may be included in the controller 170, rather than in the user input interface 150.

Figure 5:
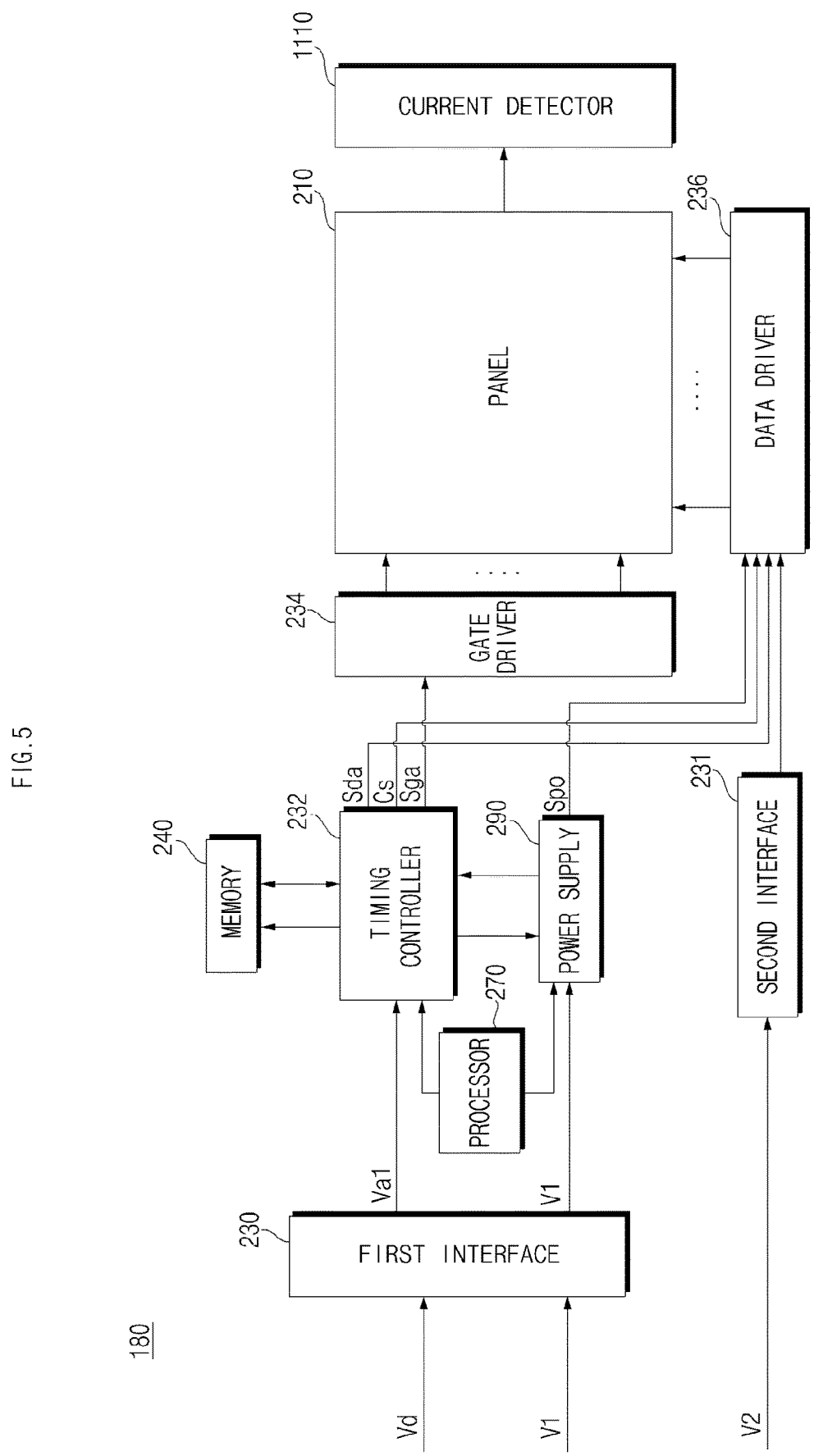
FIG. 5 is an internal block diagram of a display of FIG. 2.

FIG. 5 is an internal block diagram of a display of FIG. 2.

Referring to FIG. 5, the display 180 using an OLED panel includes an organic light-emitting diode (OLED) panel 210, a first interface 230, a second interface 231, a timing controller 232, a gate driver 234, a data driver 236, a memory 240, a processor 270, a power supply 290, a current detector 1110, and the like.

The display 180 receives a video signal Vd, a first direct current power source V1, and a second direct current power source V2, and may display a predetermined video based on the video signal Vd.

The first interface 230 included in the display 180 may receive the video signal Vd and the first direct current power source V1 from the controller 170.

Here, the first direct current power source V1 may be used for operation of the power supply 290 and the timing controller 232 which are included in the display 180.

The second interface 231 may receive the second direct current power source V2 from the external power source unit 190. The second direct current power source V2 may be input to the data driver 236 in the display 180.

The timing controller 232 may output a data driving signal Sda and a gate driving signal Sga based on the video signal Vd.

For example, in the case where the first interface 230 converts the input video signal Vd and outputs the converted video signal va1, the timing controller 232 may output the data driving signal Sda and the gate driving signal Sga based on the converted video signal va1.

In addition to the video signal Vd received from controller 170, the timing controller 232 may further receive a vertical synchronization signal Vsync.

Further, based on a control signal, the vertical synchronization signal Vsync, and the like as well as the video signal Vd, the timing controller 232 may output the gate driving signal Sga for operation of the gate driver 234, and the data driving signal Sda for operation of the data driver 236.

In the case where the OLED panel 210 includes RGBW sub-pixels, the data driving signal Sda may be a data driving signal for driving the RGBW sub-pixels.

In addition, the timing controller 232 may further output a control signal Cs to the gate driver 234.

The gate driver 234 and the data driver 236 may supply a scan signal and a video signal to the OLED panel 210 through gate lines GL and data lines DL according to the gate driving signal Sga and the data driving signal Sda which are output from the timing controller 232, thereby enabling the OLED panel 210 to display a predetermined video.

The OLED panel 210 may include an organic light-emitting layer, and each pixel corresponding to the organic light-emitting layer includes a plurality of gate lines GL and data lines DL that cross each other in a matrix form in order to display a video.

The data driver 236 may output a data signal to the OLED panel 210 based on the second direct current power source V2 from the second interface 231.

The power supply 290 may supply various power sources to the gate driver 234, the data driver 235, the timing controller 232, and the like.

The current detector 1110 may detect a current flowing to sub-pixels of the OLED panel 210. The detected current may be input to the processor 270 and the like for calculating an accumulated current amount.

The processor 270 may perform various control operations in the display 180. For example, the processor 270 may control the gate driver 234, the data driver 236, the timing controller 232, and the like.

The processor 270 may receive information on the current flowing to the sub-pixels of the OLED 210 from the current detector 1110.

Further, the processor 270 may calculate an accumulated current amount of the sub-pixels of each OLED panel 210 based on the information on the current flowing to the sub-pixels of the OLED 210, and the calculated accumulated current amount may be stored in a memory 240.

In the case where the accumulated current amount of sub-pixels of each OLED panel 210 is equal to or higher than an allowable value, the processor 270 may determine that the burn-in phenomenon occurs in the sub-pixels.

For example, in the case where the accumulated current amount of sub-pixels of each OLED panel 210 is equal to or higher than 300000 A, the processor 270 may determine the sub-pixels to be burn-in sub-pixels.

Further, in the case where an accumulated current of some of the sub-pixels of each OLED panel 210 is close to the allowable value, the processor 270 may determine that the burn-in is predicted for the sub-pixels.

Based on the current detected by the current detector 1110, the processor 270 may determine a sub-pixel having the largest accumulated current amount to be a sub-pixel for which the burn-in is predicted.

Figure 6A:
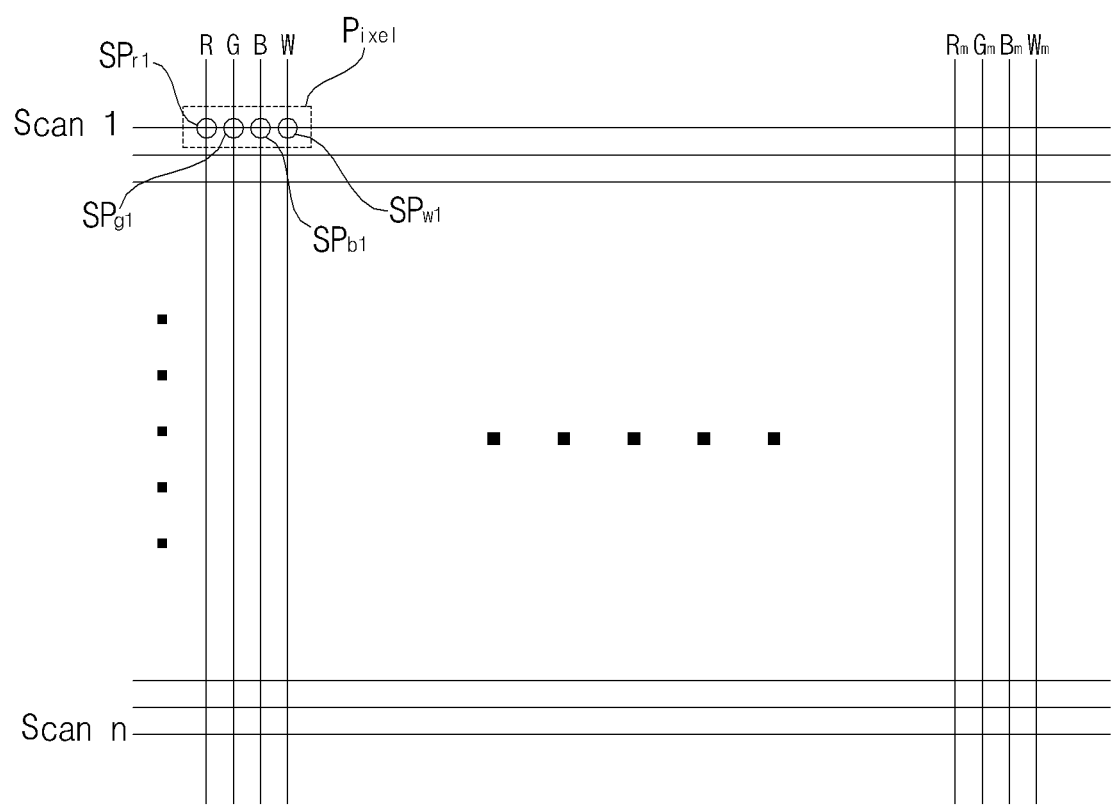
FIGS. 6A and 6B are diagrams referred to in explaining an OLED panel of FIG. 5.
Figure 6B:
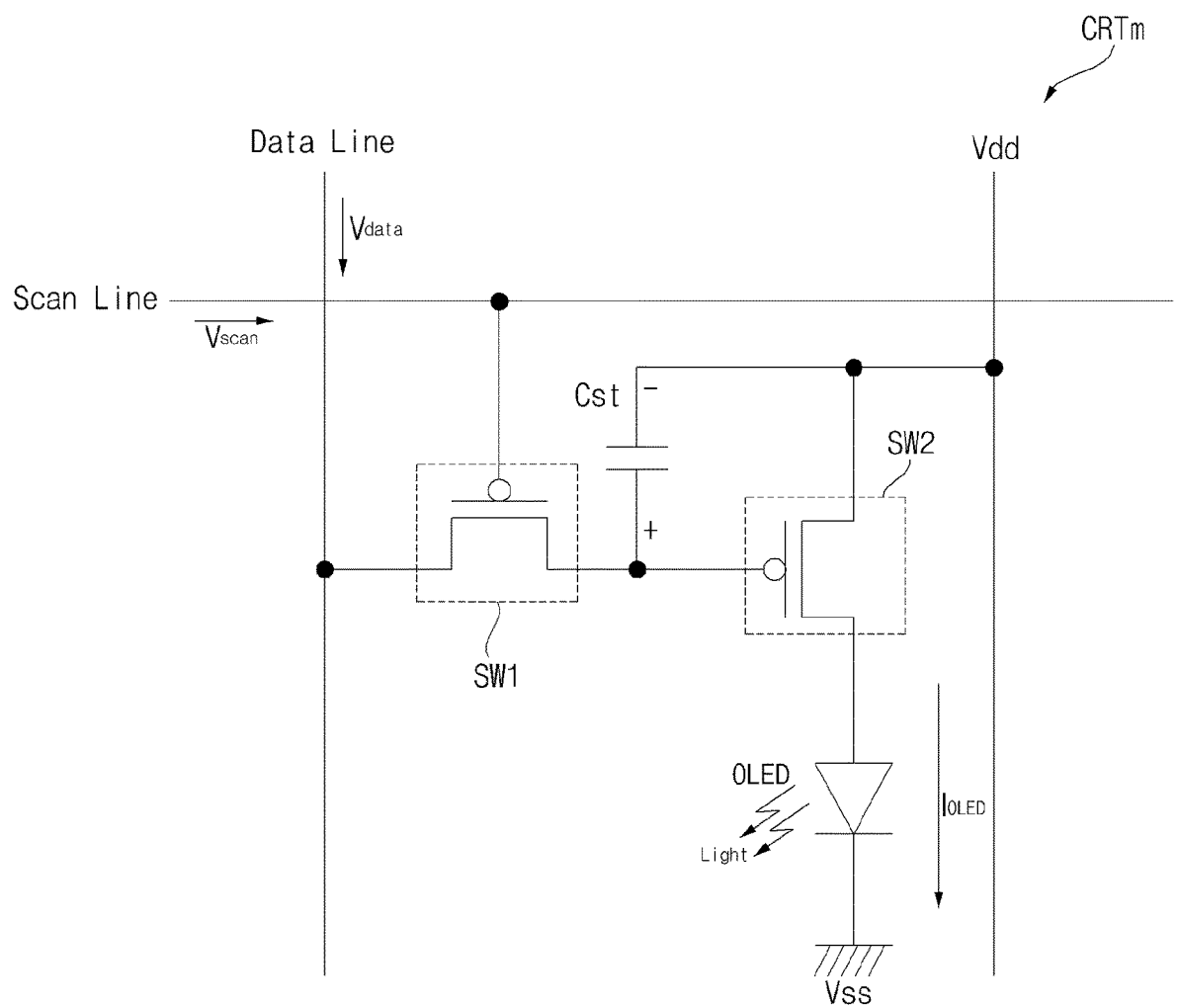

FIGS. 6A and 6B are diagrams referred to in explaining an OLED panel of FIG. 5.

FIG. 6A is a diagram illustrating a pixel of an OLED panel 210.

Referring to FIG. 6A, the OLED panel 210 may include a plurality of scan lines Scan 1 to Scan n, and a plurality of data lines R1, G1, B1, W1, . . . and Rm, Gm, Bm, and Wm that cross the scan lines Scan 1 to Scan n.

Sub-pixels are defined at crossing regions of the scan lines and the data lines of the OLED panel 210. FIG. 6A illustrates a pixel including RGBW sub-pixels SR1, SG1, SB1, and SW1.

FIG. 6B illustrates a circuit of any one sub-pixel included in the pixel of the OLED panel of FIG. 6A.

Referring to the drawings, a sub-pixel circuit CRT of the OLED panel 210 is of an active type, and may include a switching transistor SW1, a storage capacitor Cst, a driving transistor SW2, and an OLED layer.

The switching transistor SW1 is turned on in response to a scan signal Vdscan input from the scan line connected to a gate terminal. When being turned on, the switching transistor SW1 transmits an input data signal Vdata is to a gate terminal of the driving transistor SW2, or to one end of the storage capacitor Cst.

The storage capacitor Cst is provided between the gate terminal and the source terminal of the driving transistor SW2, and stores a predetermined difference between a level of a data signal, which is transmitted to one end of the storage capacitor Cst, and a level of direct current power (VDD) which is transmitted to the other end of the storage capacitor Cst.

For example, in the case where data signals have different levels by a pulse amplitude modulation (PAM) method, a power level stored in the storage capacitor Cst varies according to a level difference of the data signals (Vdata).

In another example, in the case where data signals have different pulse widths by a pulse width modulation (PWM)

method, a power level stored in the storage capacitor Cst varies according to a pulse width difference of the data signals (Vdata).

The driving transistor SW2 is turned on according to the power level stored in the storage capacitor Cst. When the driving transistor SW2 is turned on, a driving current IOLED, which is proportional to the stored power level, flows to the OLED layer, thereby enabling the OLED layer to perform a light-emitting operation.

The OLED layer includes an RGBW light-emitting layer (EML) corresponding to sub-pixels, and may include at least one of a hole injection layer (HIL), a hole transport layer (HTL), an electronic transport layer (ETL), and an electronic injection layer (EIL). In addition to these layers, the OLED layer may further include a hole blocking layer and the like.

All the sub-pixels output white light in the OLED layer, but in the case of green, red, and blue sub-pixels, a color filter is provided separately to display colors. That is, each of the green, red, and blue sub-pixels may further include a color filter, whereas the white sub-pixels, which output white light, do not require any color filter.

In the drawings, as the switching transistor SW1 and the driving transistor SW2, a p-type MOSFET is used, but an n-type MOSFET and other switching devices, such as JFET, IGBT, or SIC, may also be used.

A pixel of a hold-type organic light-emitting layer (OLED) continues to emit light during a unit display period, specifically a unit frame period, after a scan signal is applied.

A Pixel emits light as current flows to an OLED included in each sub-pixel illustrated in FIG. 6B, but the burn-in phenomenon occurs due to an accumulated current.

Specifically, when a broadcast video is displayed, a logo included in the broadcast video may increase the possibility of the burn-in occurrence. Accordingly, it is important to detect a static area included in the broadcast video and the like, and change a brightness level of the static area, to reduce the burn-in phenomenon.

A method of detecting the static area and changing the brightness level will be described with reference to FIGS. 7A to 8C.

FIGS. 7A to 8B are diagrams referred to in explaining an example of changing a brightness level upon detecting a static area in a video at an image display apparatus having an OLED panel.

Figure 7A:
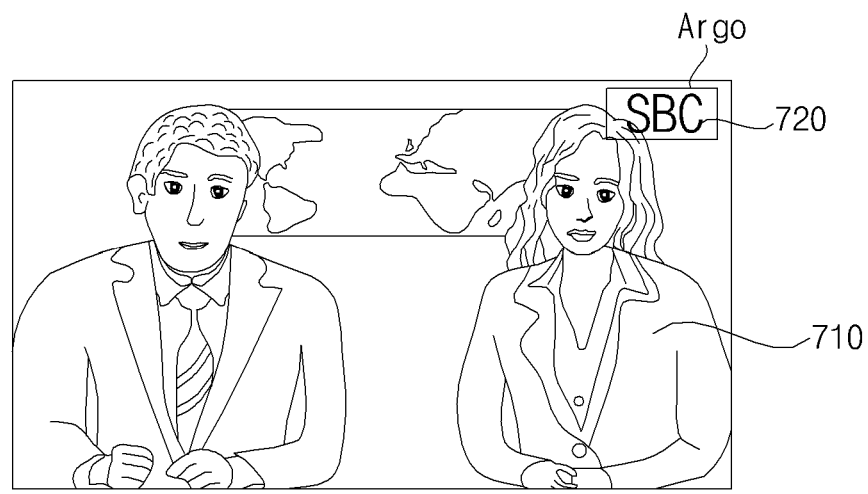
FIGS. 7A to 8C are diagrams referred to in explaining an example of changing a brightness level upon detecting a static area in a video at an image display apparatus having an OLED panel.

FIG. 7A illustrates an example where a logo area Argo is included in a broadcast video 710, in which "SBC" is used as an example of a logo 720.

In the case where the logo is included in the broadcast video, the logo area Argo may cause the burn-in phenomenon in the OLED panel 210, such that it is desirable to reduce the burn-in phenomenon by reducing a brightness level of the logo area Argo.

The logo in the broadcast video may be detected based on brightness information of pixel data in the broadcast video.

In this case, the logo is detected by using a difference between a brightness level of a static area and a brightness level of a surrounding area of the static area.

Figure 7B:
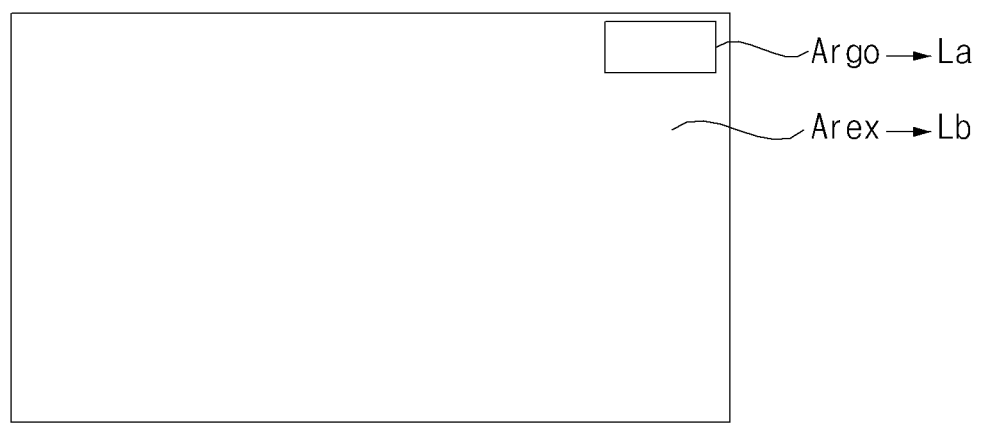

FIG. 7B illustrates an example where a brightness level of the logo area Argo is La, and a brightness level of other area Arex than the static area is Lb, in which La and Lb may be an average brightness level in units of frames.

As illustrated in FIG. 7B, in the case where the brightness level La is equal to or higher, by a predetermined value, than the brightness level Lb of the other area Arex than the static area, the logo area Argo may be determined to be a static area.

Figure 7C:
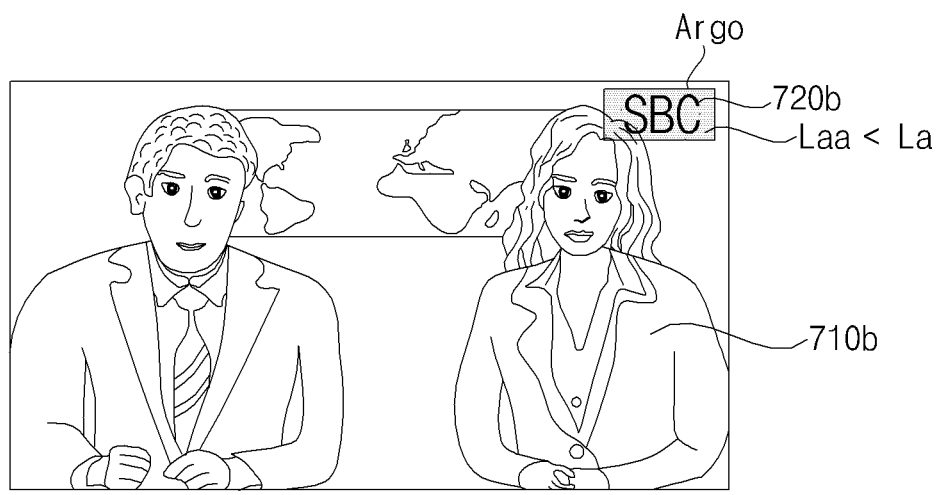

Then as illustrated in FIG. 7C, a logo 720b is displayed with a brightness level Laa which is lower than the originally assigned brightness level La of the logo area Argo.

Figure 8A:
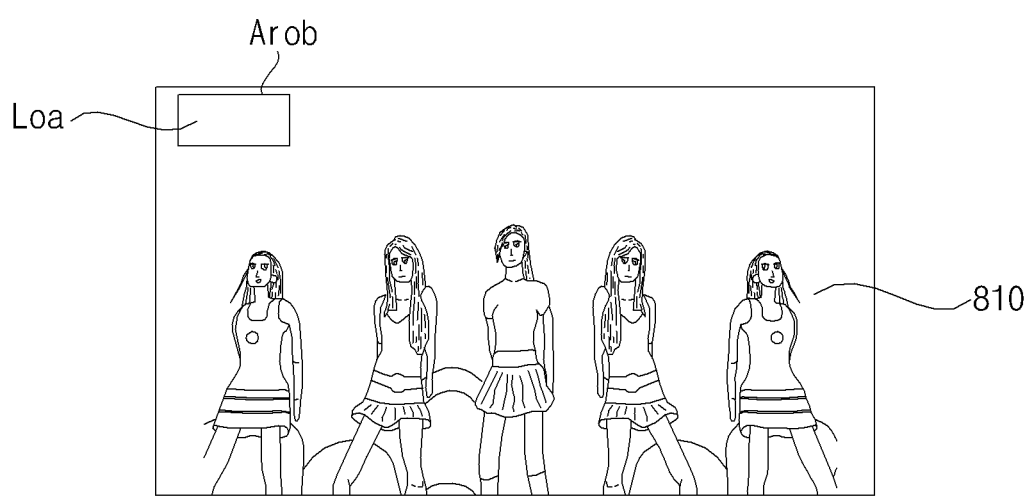
Figure 8B:
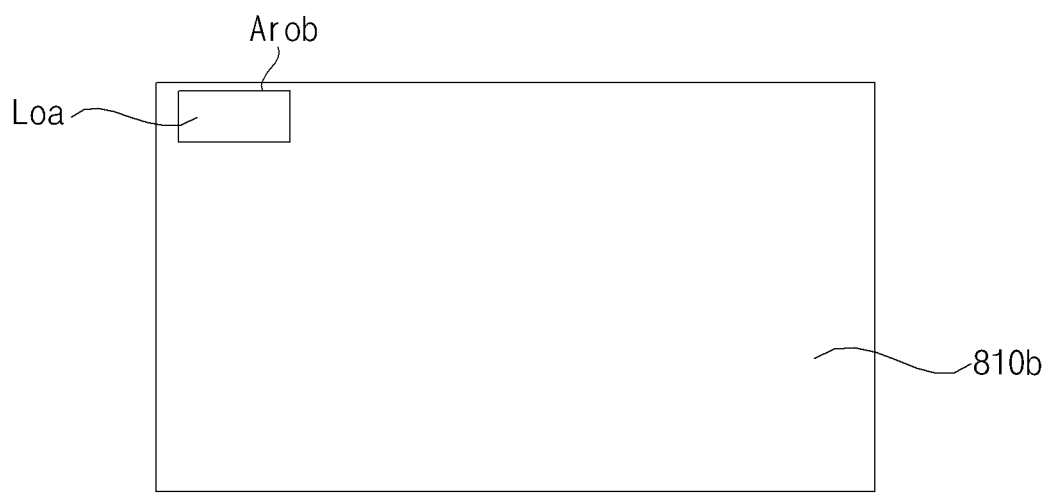
Figure 8C:
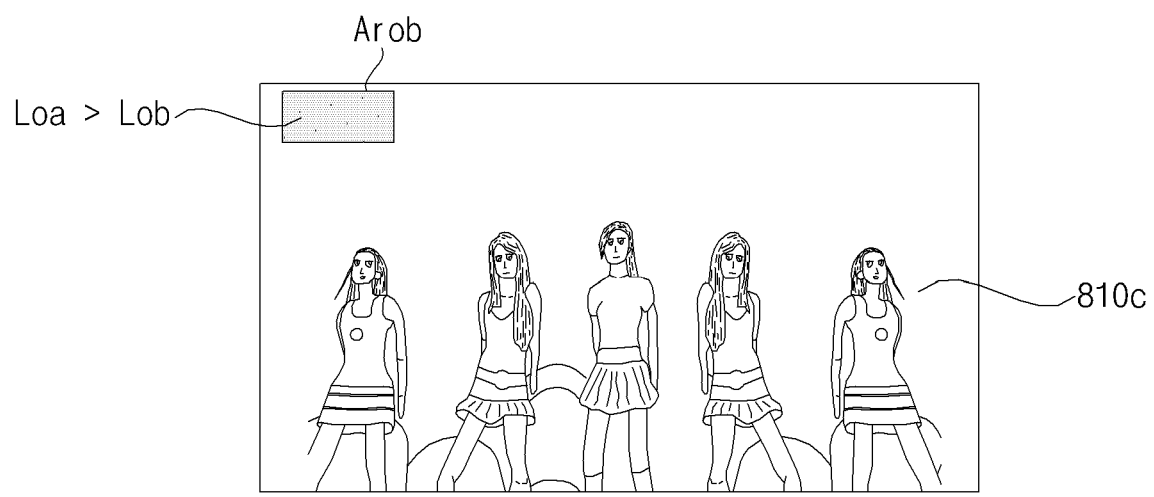

In the case where the static area is detected based on the brightness information of the pixel data, the static area may be erroneously detected as illustrated in FIGS. 8A to 8C.

FIG. 8A illustrates an example where a predetermined area Arob is included in a video 810.

As illustrated in FIGS. 7A to 7C, when the static area is detected based on the brightness information of the pixel data of the video, there may be a case where color information of the pixel data is changed in units of frames, such that the brightness of the pixel data is maintained in a predetermined range.

That is, as illustrated in FIG. 8B, in the case where the brightness of the area Arob is maintained approximately at a level Loa even when the color of the area Arob is changed, such that a brightness difference between the area Arob and the surrounding area is equal to or higher than a predetermined value, the area Arob may be erroneously determined to be a static area.

In the case where the area Arob is erroneously determined to be a static area, the area Arob, which is erroneously determined to be the static area due to the logo in the video 810c, may be displayed with a brightness level of Lob which is lower than the assigned brightness level Loa, as illustrated in FIG. 8C.

In this case, the area Arob of FIG. 8C is displayed dark and may appear to be bruised when compared to a surrounding area.

The present invention provides a method to prevent erroneous detection of the static area, which will be described below with reference to FIG. 9 and the following figures.

Figure 9:
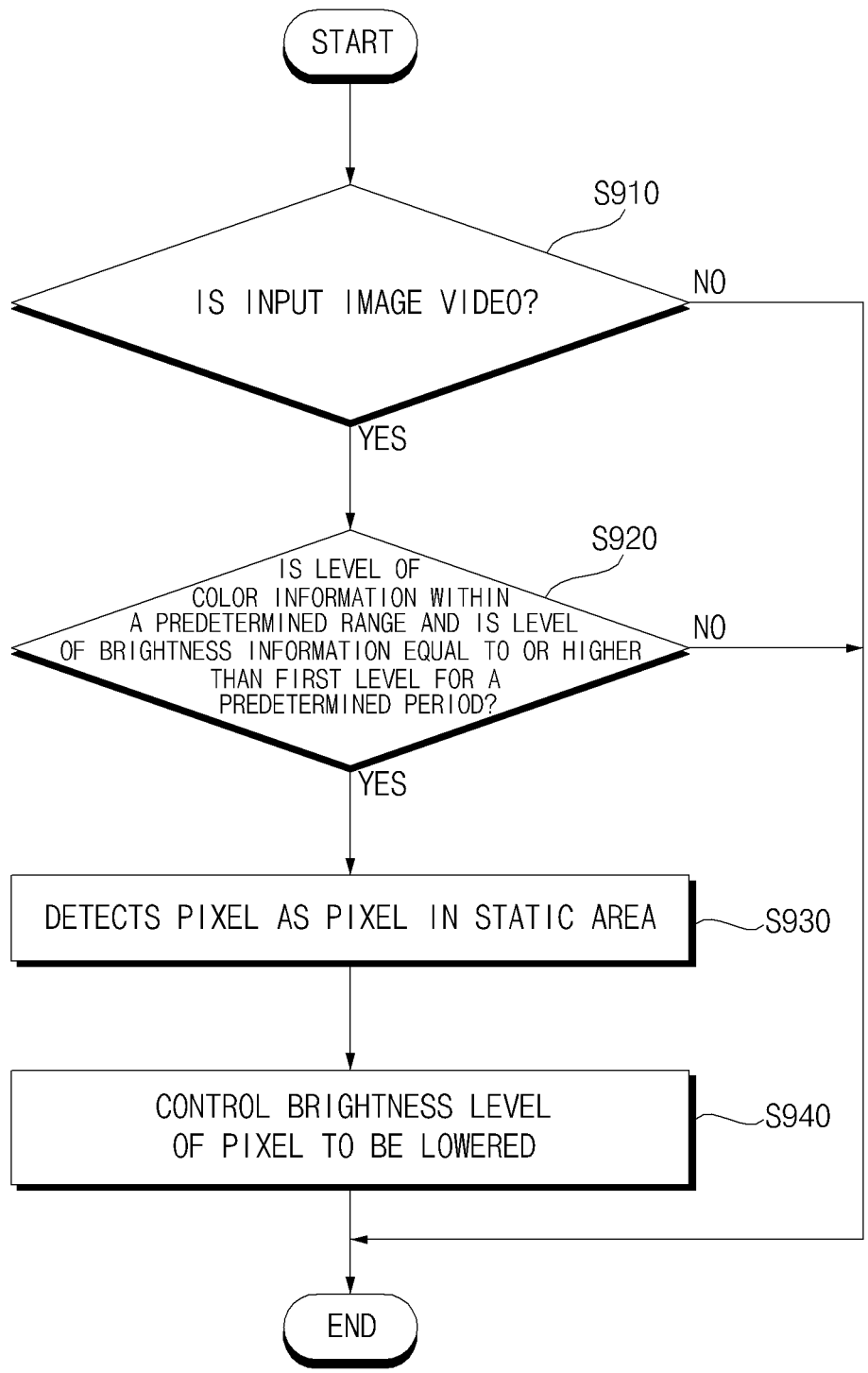
FIG. 9 is a flowchart illustrating an example of operating an image display apparatus according to an embodiment of the present invention.

FIG. 9 is a flowchart illustrating an example of operating an image display apparatus according to an embodiment of the present invention, and FIGS. 10A to 16C are diagrams referred to in explaining the operating method of FIG. 9.

First, referring to FIG. 9, the controller 170 of the image display apparatus 100 determines whether an input image is a still image or a video in S910.

In the case where the input image is a still image, the controller 170 of the image display apparatus 100 controls not to perform detection of a static area in the video according to the present invention, and in the case where the input image is a video, the controller 170 of the image display apparatus 100 controls the following operation S920 to be performed.

The input image may be a broadcast video, or an external input video.

The broadcast video may be a terrestrial broadcast video or a cable broadcast video, and may be received through the tuner 110 illustrated in FIG. 2.

Alternatively, the broadcast video may be a stream broadcast video received through the network interface 135.

The external input video may be a video input from a set-top box, a video input from a game console, or a video input from a Blu-ray player or an USB storage device.

Here, the external input video may be a video received through the external device interface 130. Alternatively, the external input video may be a stream broadcast video received through the network interface 135.

Then, in the case where the input image is a video, the controller 170 of the image display apparatus 100 determines whether a variation in a level of color information of the first pixel data corresponding to the first pixel in the input video is within a predetermined range and a level of brightness information of the first pixel data is equal to or higher than a first level for a predetermined period of time in S920, and if so, the controller 170 of the image display apparatus 100 detects the first pixel as a pixel in the static area in S930, and may control the brightness level of the first pixel data to decrease in S940.

Here, the static area is an area that is repeatedly displayed with its position being fixed in the video without being changed. Examples of the static area may include a logo area including a logo of a broadcasting station, a broadcasting channel number area, or a program title area in the broadcast video, or a logo area, a title area, or a menu area in an external input video.

In the case where the input video is a video, and a logo, a channel number, a title, a menu, or the like is repeatedly displayed in a first area of the video during, for example, 30 image frames, the controller 170 of the image display apparatus 100 may determine the first area to be a static area which is not changed during a plurality of frames.

That is, the static area may refer to an area that is repeatedly displayed during a predetermined image frames.

The controller 170 of the image display apparatus 100 may process a signal for an input video, and may output, to the display 180, RGB data or RGBW data to be displayed on the display 180.

In this case, the pixel data of the input video may be RGB data or RGBW data.

Alternatively, the pixel data of the input video may be YCbCr data or YRGB data.

The controller 170 of the image display apparatus 100 may process a signal for an input video and may convert the input video into YCbCr data or YRGB data, or may convert the data again into RGB data or RGBW data to output the data to the display 180.

Figure 10A:
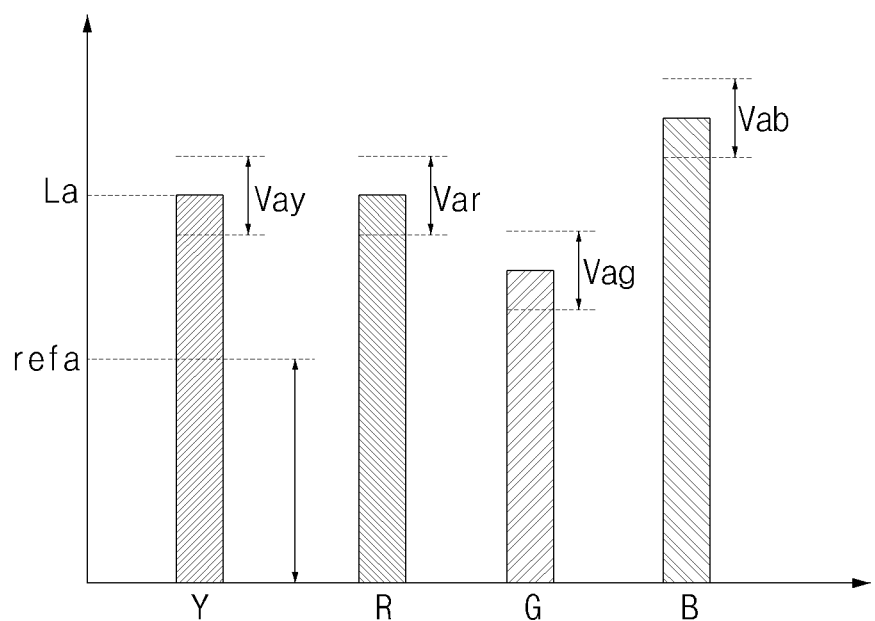
FIGS. 10A to 16C are diagrams referred to in explaining the operating method of FIG. 9

FIG. 10A illustrates YRGB data as an example of pixel data.

By using Y data which is brightness information in the YRGB data that is pixel data, and RGB data which is color information, the controller 170 of the image display apparatus 100 may detect the static area in the video.

As illustrated in FIG. 10A, the controller 170 of the image display apparatus 100 determines whether a variation of the RGB data is within predetermined ranges Var, Vag, and Vab for a predetermined period of time.

Since the color of the static area in the video rarely changes, the static area may be detected by checking a variation of the color of the pixel data in the present invention.

The controller 170 of the image display apparatus 100 determines whether a level of the Y data is equal to or higher than a first level refa for a predetermined period of time as illustrated in FIG. 10A.

The brightness of the static area rarely changes, and the level is higher than a brightness level of a surrounding area for visibility, such that the controller 170 checks whether the brightness level of the static area is equal to or higher than the first level.

FIG. 10A illustrates an example where a variation in the level of color information of the pixel data is within a predetermined range, and the level of brightness information of the pixel data is equal to or higher than the first level.

In this case, the controller 170 of the image display apparatus 100 may determine the pixel data to be a pixel in the static area, and may detect the pixel as a pixel in the static area.

In addition, the controller 170 of the image display apparatus 100 may further determine whether a variation in the level of the Y data is within a predetermined range for a predetermined period of time, as illustrated in FIG. 10A, and if so, the controller 170 of the image display apparatus 100 may detect the pixel as a pixel in the static area.

Moreover, the controller 170 of the image display apparatus 100 may further determine whether the level of the RGB data is equal to or higher than the first level for a predetermined period of time as illustrated in FIG. 10A, and if so, the controller 170 of the image display apparatus 100 may detect the pixel as a pixel in the static area, particularly as a pixel in the logo area.

Figure 10B:
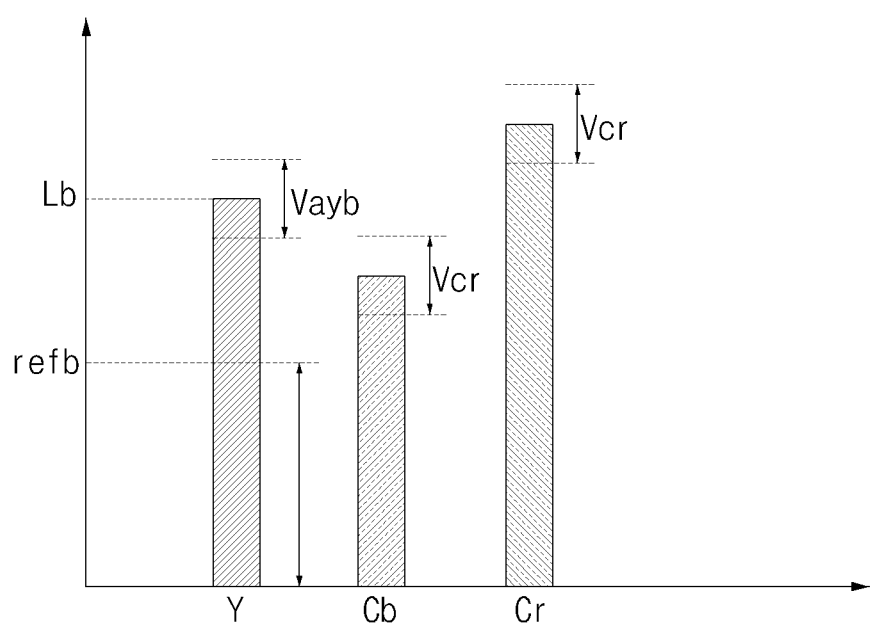

FIG. 10B illustrates YCbCr data as an example of pixel data.

By using Y data which is brightness information, and CbCr data which is color information in the YCbCr data that is pixel data, the controller 170 of the image display apparatus 100 may detect the static area in the video.

As illustrated in FIG. 10B, the controller 170 of the image display apparatus 100 determines whether a variation of the CbCr data is within predetermined ranges Vcb and Vcr for a predetermined period of time.

Since the color of the static area in the video rarely changes, the static area may be detected by checking a variation of the color of the pixel data in the present invention.

The controller 170 of the image display apparatus 100 determines whether a level of the Y data is equal to or higher than a first level refb for a predetermined period of time as illustrated in FIG. 10B.

Since the brightness of the static area rarely changes, and the level is higher than a brightness level of a surrounding area for visibility, the controller 170 checks whether the brightness level of the static area is equal to or higher than the first level.

FIG. 10B illustrates an example where a variation in the level of color information of the pixel data is within a predetermined range, and the level of brightness information of the pixel data is equal to or higher than the first level.

In this case, the controller 170 of the image display apparatus 100 may determine the pixel data to be a pixel in the static area, and may detect the pixel as a pixel in the static area.

In addition, the controller 170 of the image display apparatus 100 may further determine whether a variation in the level of the Y data is within a predetermined range for a predetermined period of time, as illustrated in FIG. 10B, and if so, the controller 170 of the image display apparatus 100 may detect the pixel as a pixel in the static area, particularly as a pixel in the logo area.

Moreover, the controller 170 of the image display apparatus 100 may further determine whether the level of the CbCr data is equal to or higher than the first level for a predetermined period of time as illustrated in FIG. 10B, and if so, the controller 170 of the image display apparatus 100 may detect the pixel as a pixel in the static area, particularly as a pixel in the logo area.

Further, in the case where the input image is a video, and for every n-th image frame, the variation in the level of color information of first pixel data corresponding to the first pixel in the input video is within a predetermined range and the level of brightness information of the first pixel data is equal to or higher than the first level, the controller 170 of the image display apparatus 100 may detect the first pixel as a pixel in the static area.

Accordingly, detection of the static area in the video is repeated every n-th image frame, such that the static area in the video may be detected periodically and correctly.

FIGS. 11A to 12B are diagrams referred to in explaining an example of changing the level of brightness upon detecting a static area in a video at an image display apparatus having an OLED panel.

Figure 11A:
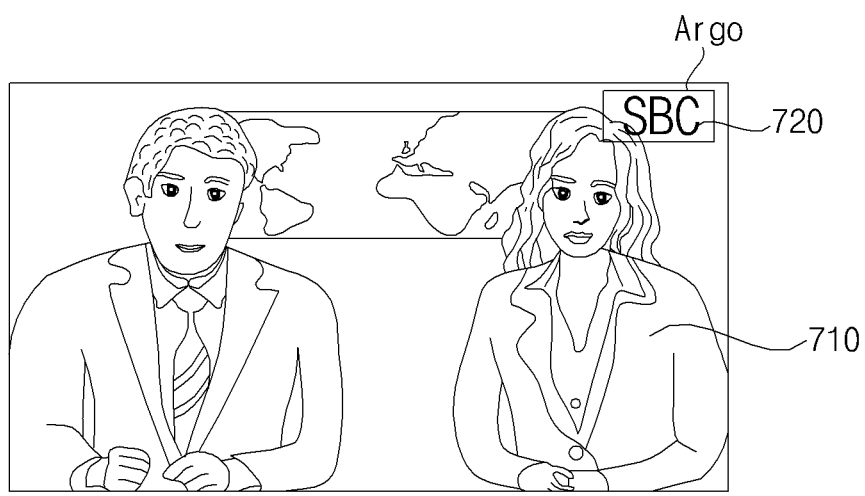

First, FIG. 11A illustrates an example where a static area, particularly a logo area Argo, is included in a broadcast video 710, in which "SBC" is used as an example of a logo 720.

In the case where the logo is included in the broadcast video, the logo area Argo may cause the burn-in phenomenon in the OLED panel 210, such that it is desirable to reduce the burn-in phenomenon by reducing a brightness level of the logo area Argo.

As described above, in the present invention, the static area in the broadcast video may be detected by using both brightness information and color information of pixel data.

Figure 11B:
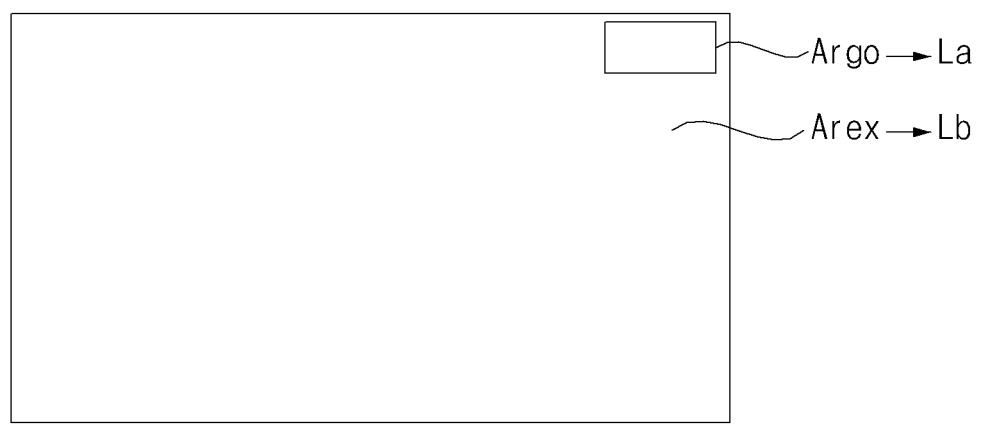

FIG. 11B illustrates an example where a brightness level of the logo area Argo is La, and a brightness level of other area Arex than the static area is Lb. La and Lb may be an average brightness level in units of frames.

As illustrated in FIG. 11B, in the case where the brightness level La of the area Argo is equal to or higher than a first level (refa or refb), and a variation in color information of the area Argo is within a predetermined range, the controller 170 of the image display apparatus 100 may detect the area Argo as the static area.

Figure 11C:
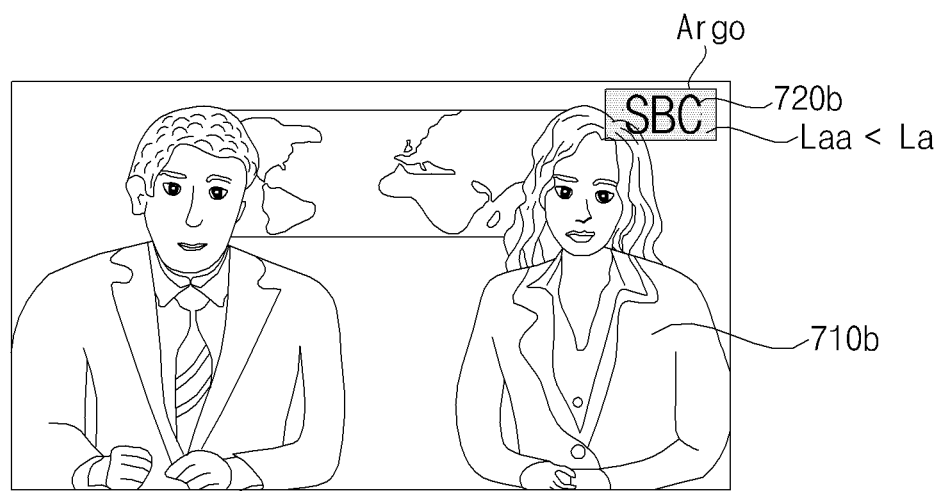

Then, as illustrated in FIG. 11C, the controller 170 of the image display apparatus 100 may display a logo 720b with a brightness level Laa which is lower than the originally assigned brightness level La of the logo area Argo.

Accordingly, the static area may be correctly detected at the image display apparatus 100.

Further, after the static area in the video is correctly detected at the image display apparatus 100, the brightness of the static area is changed such that the burn-in phenomenon of the static area may be reduced, thus extending the life of the image display apparatus 100.

Figure 12A:
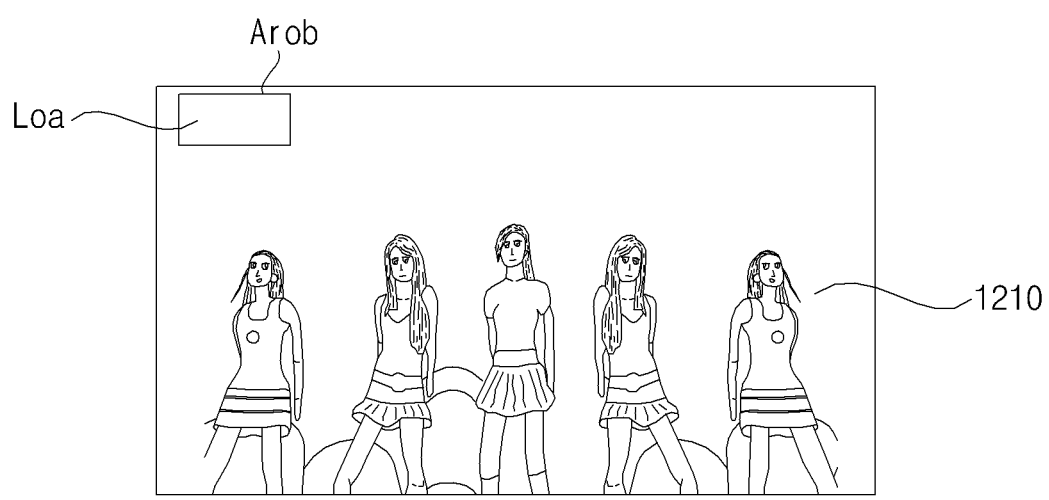

FIG. 12A illustrates an example where a predetermined area Arob is included in a video 1210.

Figure 12B:
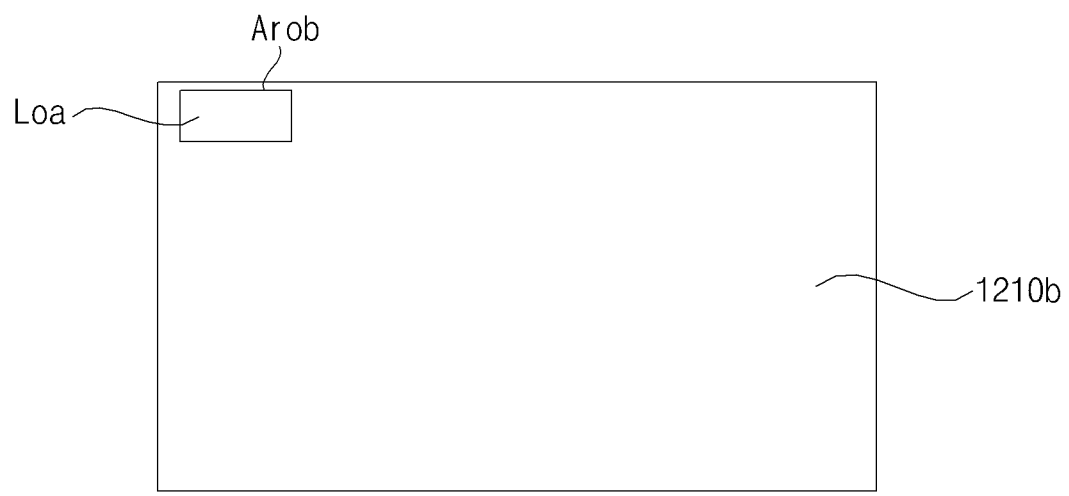

That is, as illustrated in FIG. 12B, in the case where the brightness of the area Arob is maintained approximately at a level Loa, but the color of the area Arob is changed such that a variation in the level of color information falls outside of a predetermined range, the controller 170 of the image display apparatus 100 may determine that the area Arob is not a static area.

That is, unlike FIG. 8B, the controller 170 of the image display apparatus 100 may determine that the area Arob is not a static area according to an embodiment of the present invention.

Figure 12C:
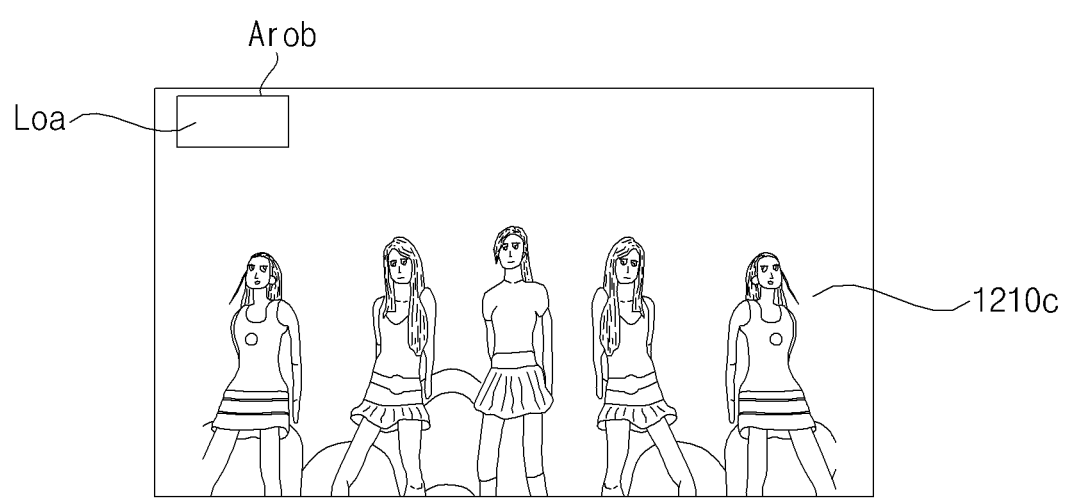

Accordingly, as illustrated in FIG. 12C, for the area Arob included in the video 1210c, the level of brightness is not reduced, and the assigned brightness level may be displayed as it is.

Accordingly, the area Arob may be prevented from being displayed dark and appearing to be bruised when compared to a surrounding area as illustrated in FIG. 8C.

The network interface 135 or the external device interface 130 may receive information on the static area in the video from an external server or an external device.

Accordingly, based on the received information on the static area in the video, the controller 170 may detect the static area, and in the case where the level of brightness information in the first pixel data corresponding to the first pixel in the detected static area is equal to or higher than the first level, the controller 170 may detect the first pixel as a pixel in the static area of the video, and may control the brightness level of the first pixel data to decrease, thus detecting the static area more correctly and rapidly.

The controller 170 may detect the static area, and may control the brightness level of the static area to decrease, particularly, to be lower than the assigned brightness level. For example, in the case where the assigned brightness level is 220, the controller 170 may control the brightness level of the static area to decrease to 190.

As a brightness difference between the detected static area and a surrounding area of the static area becomes higher, the controller 170 may control the brightness level of the detected static area to be further lowered.

For example, in the case where the assigned brightness level of the detected static area is 220, and the brightness level of the surrounding area of the static area is 110, the controller 170 may control the assigned brightness level of the detected static area to decrease to 160, and in the case where the assigned brightness level of the detected static area is 220, and the brightness level of the surrounding area of the static area is 80, the controller 170 may control the assigned brightness level of the detected static area to decrease to 145.

As the brightness level of the surrounding area of the static area becomes higher, the controller 170 may control a variation in the brightness level of the static area to be smaller.

For example, in the case where the assigned brightness level of the detected static area is 220, and the brightness level of the surrounding area of the static area is 110, the controller 170 may control the assigned brightness level of the detected static area to be 160, so as to control the variation thereof to be 60, and in the case where the assigned brightness level of the detected static area is 220, and the brightness level of the surrounding area of the static area is 80, the controller 170 may control the assigned brightness level of the detected static area to be 145, so as to control the variation thereof to be 75.

In the case where the input image is a video, based on color information and brightness information of the first pixel data corresponding to the first pixel in the input image, the controller 170 may determine whether the first pixel is a pixel in the static area, and in the case where the first pixel is a pixel in the static area in the video, the controller 170 may control the assigned brightness level of the first pixel data to decrease. Accordingly, the static area in the video may be detected accurately at the image display apparatus 100.

Further, after the static area in the video is correctly detected at the image display apparatus 100, the brightness of the static area is changed such that the burn-in phenomenon of the static area may be reduced, thus extending the life of the image display apparatus 100.

Figure 13:
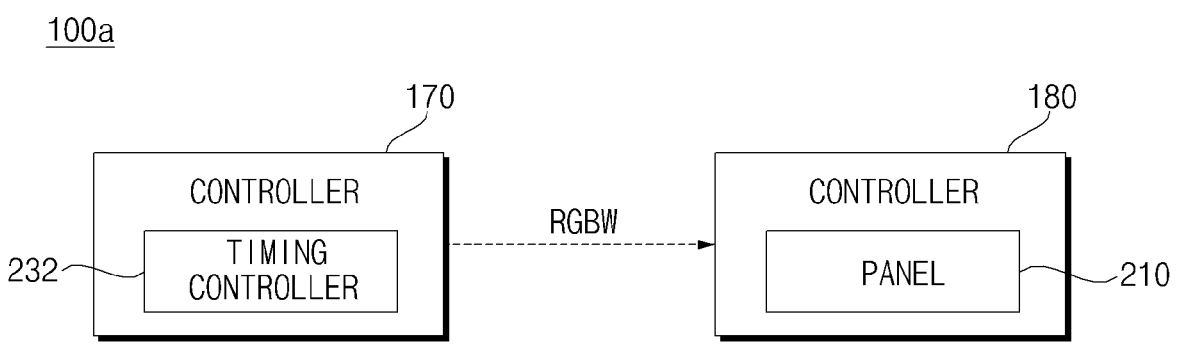

FIG. 13 illustrates an example where the timing controller 232 is included in the controller 170.

Referring to FIG. 13, the timing controller 232 may output RGBW data to the display 180.

When changing a brightness level of pixel data of the static area in the video, the controller 170, particularly the timing controller 232 of FIG. 13, may control a brightness level of W data of the RGBW data in the pixel data to decrease.

Figure 14A:
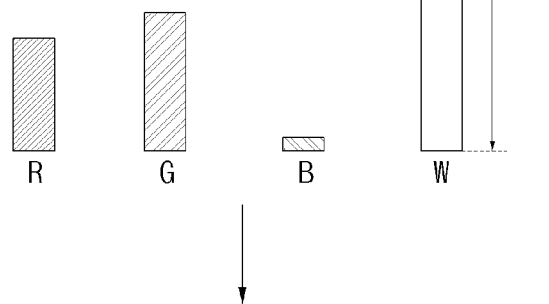
Figure 14A:
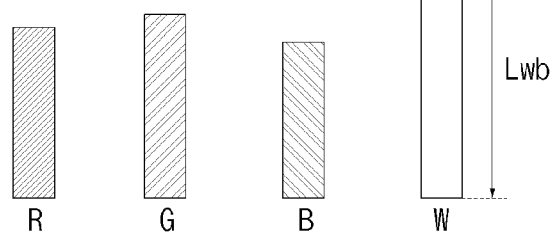

FIG. 14A illustrates an example where a level of W data of RGBW data output from the controller 170 is lowered from Lwa to Lwb. Accordingly, the OLED panel in the display 180 may display a static area having a lowered level of brightness, thereby reducing the burn-in phenomenon of the static area.

Figure 14B:
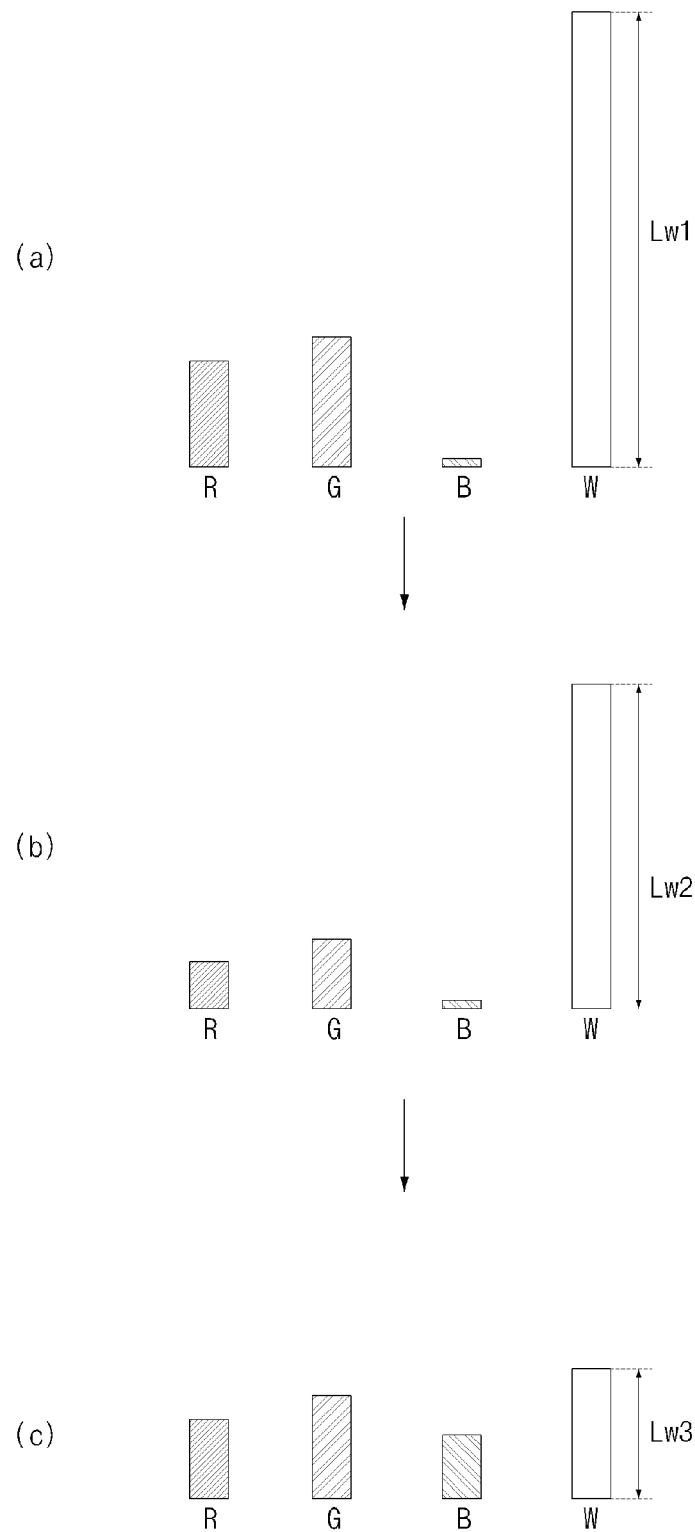

FIG. 14B illustrates an example where the level of W data of RGBW data output from the controller 170 is lowered in the order of Lw1, Lw2, and Lw3. Accordingly, the OLED panel in the display 180 may display a static area having a sequentially lowered level of brightness, thereby reducing the burn-in phenomenon of the static area.

Unlike FIGS. 14A and 14B, the controller 170 of FIG. 13, particularly the timing controller 232, may control a brightness level of RGB data of the RGBW data in the pixel data to decrease when changing a brightness level of pixel data of the static area in the video. That is, the brightness level of RGB data may be lowered instead of the W data.

In the case where a brightness level difference between the lowered brightness level of the detected static area and a brightness level of a surrounding area of the static area is equal to or lower than a reference value, the controller 170 may control a brightness of an edge area of the detected static area to be further lowered.

Figure 14C:
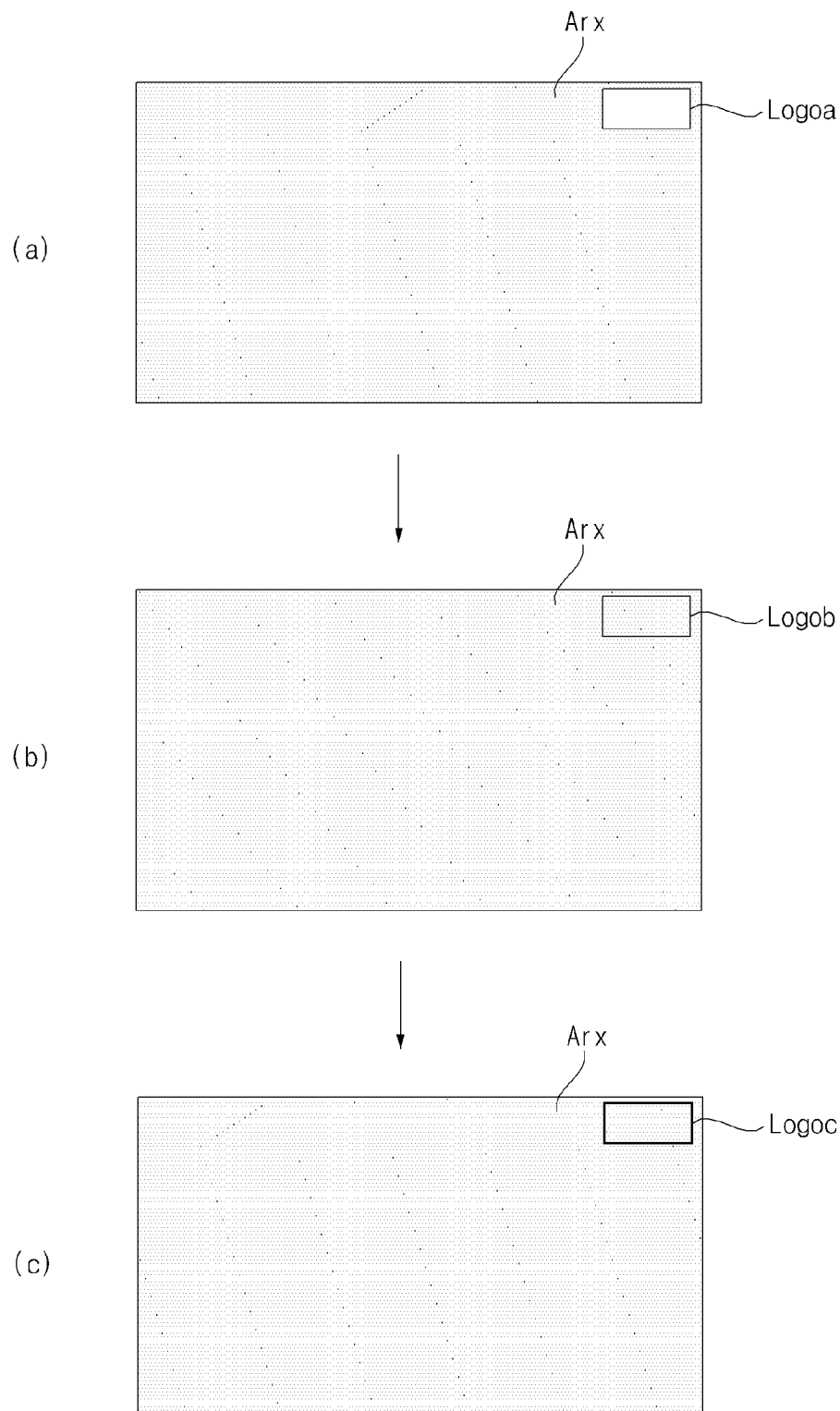

Referring to FIG. 14C, in the case where a static area logoa in a video Arx is detected as illustrated in (a) of FIG. 14C, the controller 170 may control the brightness level of the logo area logoa to decrease as illustrated in (b) of FIG. 14C.

In the case where there is almost no difference between the lowered brightness level of the logo area logoa and the brightness level of the surrounding area, i.e., the difference is equal to or lower than the reference value as illustrated in (b) of FIG. 14C, the controller 170 may control the brightness level of the edge area logoc of the detected static area to be further lowered as illustrated in (c) of FIG. 14C. That is, the controller 170 may control the edge area logoc to be highlighted, thereby improving visibility of the edge area logoc.

Figure 15:
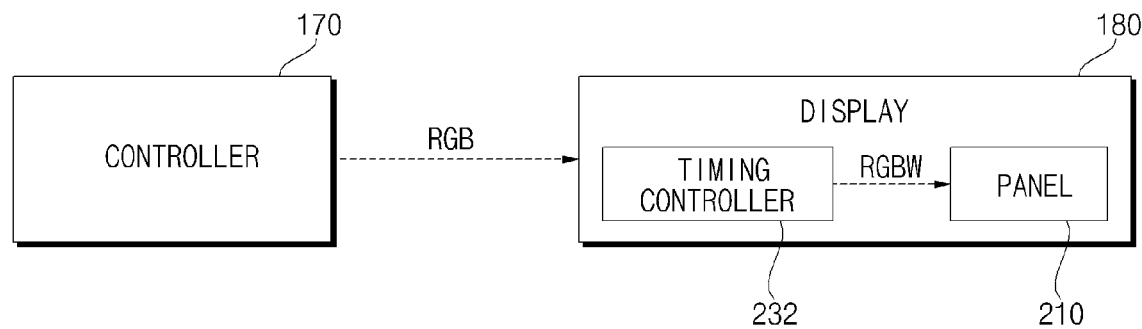

Unlike FIG. 13, FIG. 15 illustrates an example where the timing controller 232 is included in the display 180 rather than in the controller 170.

Referring to FIG. 15, the controller 170 may output RGBW data to the display 180, and the timing controller 232 may convert RGB data into RGBW data and output the RGBW data to the OLED panel 210.

When changing the brightness level of pixel data of the static area in the video, the controller 170 of FIG. 15 may control a brightness level of the RGB data to decrease, and the timing controller 232 may control a brightness level of the RGB data of the RGBW data to decrease.

Figure 16A:
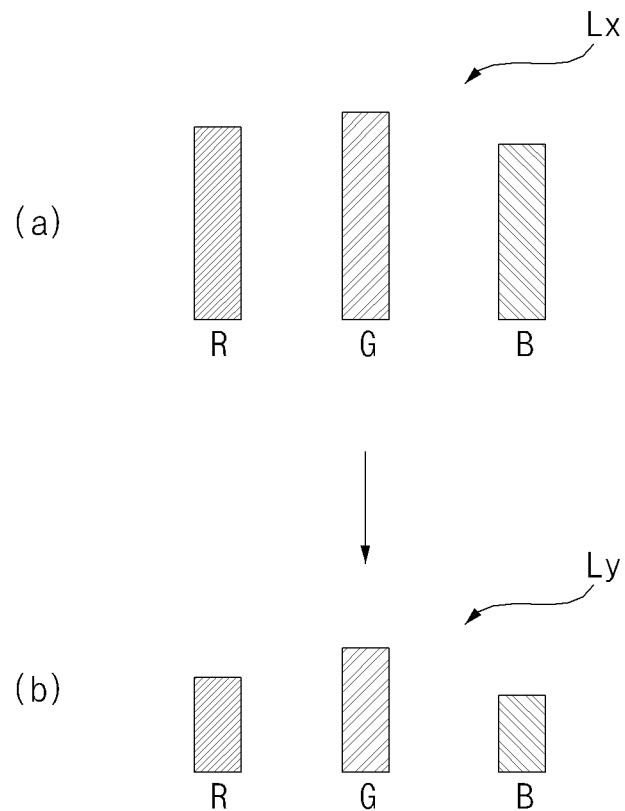

FIG. 16A illustrates an example where a brightness level of the RGB data output from the controller 170 is lowered, particularly lowered from Lx to Ly.

Accordingly, the timing controller 232 may convert the RGB data having the lowered brightness into RGBW data, and may control the brightness level of the RGB data of the RGBW data to decrease. Thus, the OLED panel in the display 180 may display a static area having a lowered brightness level, thereby reducing the burn-in phenomenon of the static area.

Figure 16B:
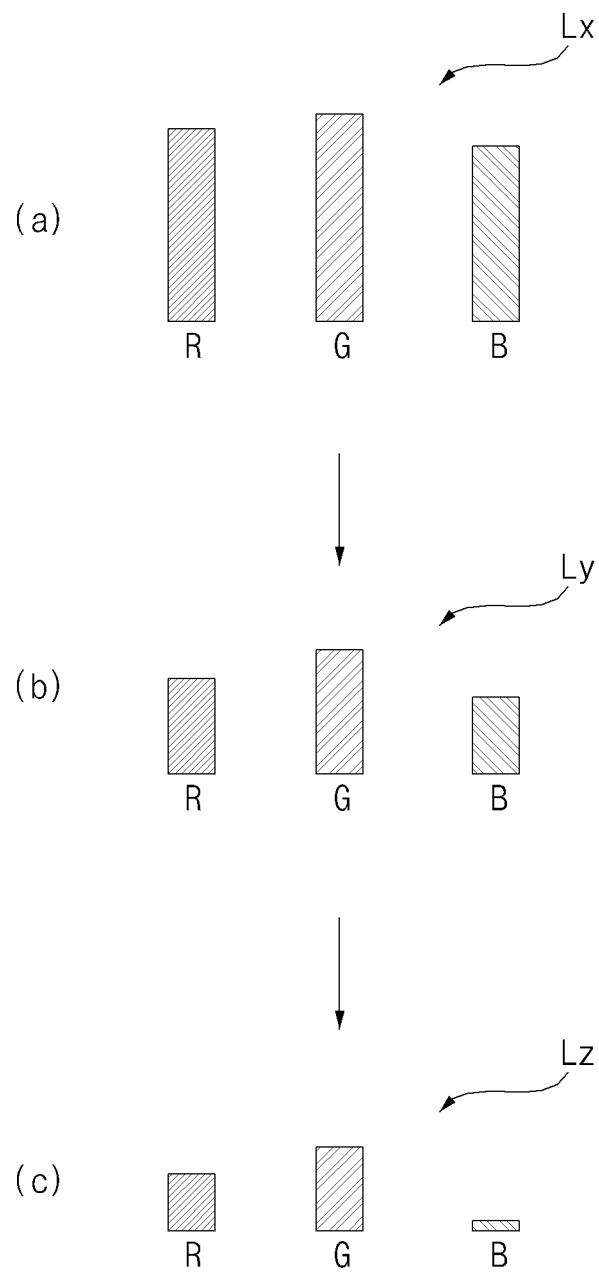

FIG. 16B illustrates an example where the brightness level of RGB data output from the controller 170 is lowered in the order of Lx, Ly, and Lz.

Accordingly, the timing controller 232 may convert the RGB data having the sequentially lowered brightness into RGBW data, and may control the brightness level of the RGB data of the RGBW data to decrease. Thus, the OLED panel in the display 180 may display a static area having the sequentially lowered brightness level, thereby reducing the burn-in phenomenon of the static area.

When converting the RGB data having a lowered brightness level into the RGBW data, the timing controller 232 of FIG. 15 may partially increase a brightness level of the RGB data, and may reduce the brightness of W data.

That is, when changing a brightness level of pixel data of the static area in the video, the controller 170 may control the brightness level of the RGB data in the pixel data of the static area, and when changing a brightness level of pixel data of the static area in the video, the timing controller 232 may control the brightness level of the W data of the RGBW data in the pixel data of the static area to decrease.

In the case where a brightness level difference between the lowered brightness level of the detected static area and a brightness level of a surrounding area of the static area is equal to or lower than a reference value, the controller 170 may control a brightness of an edge area of the detected static area to be further lowered.

Figure 16C:
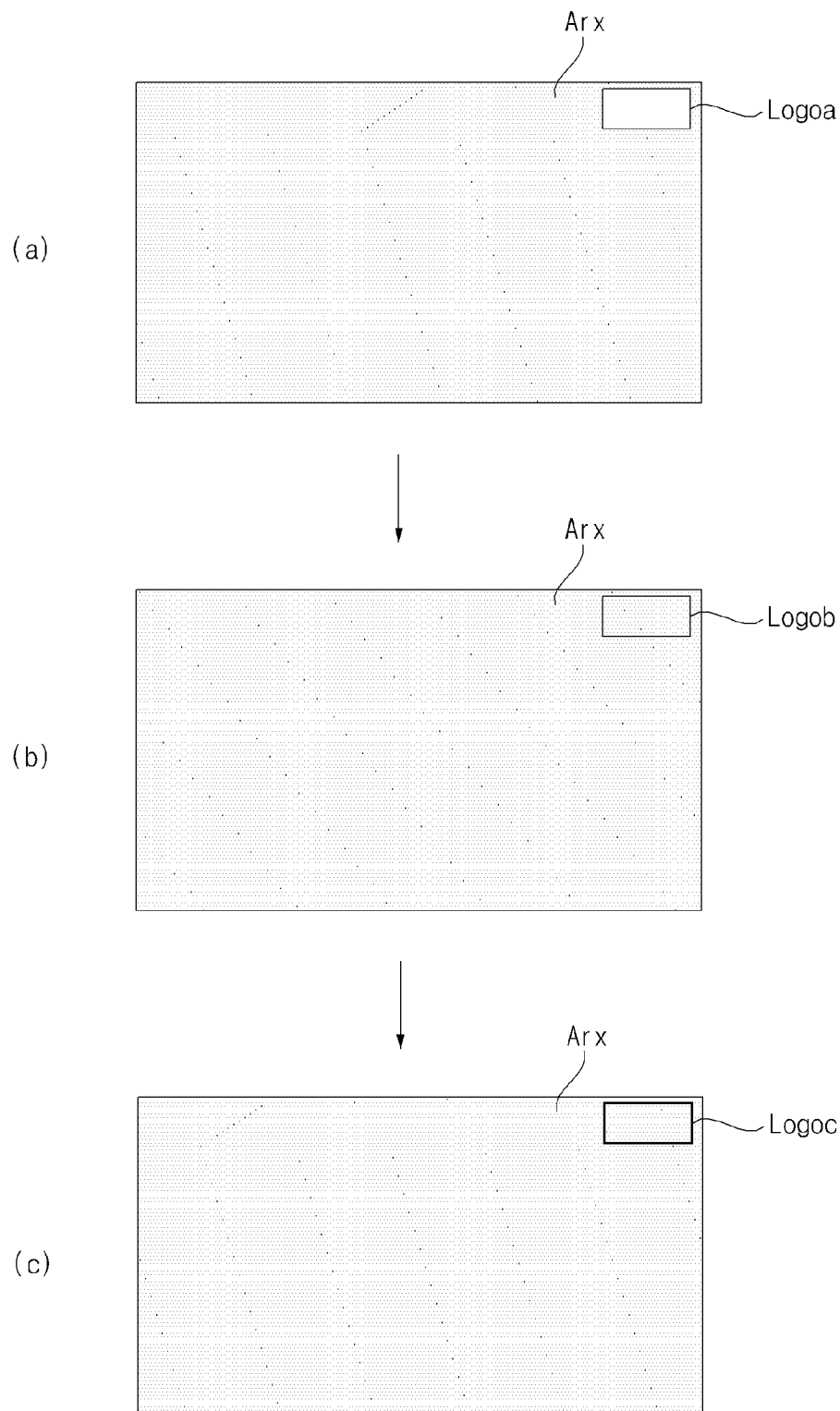

Referring to FIG. 16C, in the case where the static area, particularly the logo area logoa, in the video Arx is detected as illustrated in (a) of FIG. 16C, the controller 170 may control the brightness level of the logo area logoa to decrease as illustrated in (b) of FIG. 16C.

In the case where there is almost no difference between the lowered brightness level of the logo area logoa and the brightness level of the surrounding area, i.e., the difference is equal to or lower than the reference value as illustrated in (b) of FIG. 16C, the controller 170 may control the brightness level of the edge area logoc of the detected static area to be further lowered as illustrated in (c) of FIG. 16C. That is, the controller 170 may control the edge area logoc to be highlighted, thereby improving visibility of the edge area logoc.

As is apparent from the above description, according to an embodiment of the present invention, there is provided an image display apparatus including a display having an organic light-emitting diode (OLED) panel, and a controller to control the display, wherein in response to an input image being a video, when a variation in a level of color information of a first pixel data corresponding to a first pixel in the input image is within a predetermined range, and a level of brightness information of the first pixel data is equal to or higher than a first level, the controller detects the first pixel as a pixel in a static area, and decreases the level of brightness of the first pixel data, thereby correctly detecting the static area in the video.

Detection of the static area in the video may be repeated every n-th image frame, such that the static area in the video may be detected periodically and correctly.

Upon correctly detecting the static area in the video at the image display apparatus, the controller changes the brightness of the static area, thereby reducing the burn-in phenomenon in the static area, and extending the life of the image display apparatus.

As a brightness difference between the detected static area and a surrounding area of the static area becomes larger, the controller controls the brightness level of the detected static area to be further lowered, such that the burn-in phenomenon in the static area of the video may be further reduced.

As the brightness level of the surrounding area of the static area becomes higher, the controller controls a variation in the brightness level of the static area to be smaller, so that the brightness difference between the static area and the surrounding area of the static area may become smaller, thereby maintaining visibility of the static area.

Further, the controller receives information on the static area in the video from an external server or an external device, and detects a pixel in the static area by further using the received information, such that the static area may be detected more correctly.

According to another embodiment of the present invention, there is provided an image display apparatus including: a display having an organic light-emitting diode (OLED) panel, and a controller to control the display, wherein when an input image is a video, the controller determines whether a first pixel is a pixel in a static area based on color information and brightness information of first pixel data corresponding to the first pixel in the input image, and when the first pixel is the pixel in the static area, the controller decreases a brightness level of the assigned first pixel data, thereby correctly detecting the static area in the video.

Upon correctly detecting the static area in the video at the image display apparatus, the controller changes the brightness of the static area, thereby reducing the burn-in phenomenon in the static area, and extending the life of the image display apparatus.

The method of operating the image display apparatus of the present invention can be implemented as processor-readable code in recording media readable by a processor provided in the image display apparatus. The processor-readable recording media include all types of recording devices in which processor-readable data may be stored. Examples of the processor-readable recording media include Read Only Memory (ROM), Random Access Memory (RAM), a Compact Disc (CD)-ROM, magnetic tape, a floppy disc, an optical data storage device, etc., and also include a medium realized in the form of a carrier wave, for example, transmission performed over the Internet. Further, the processor-readable recording media may be distributed to computer systems connected through a network and processor-readable code may be stored and executed in the computer systems in a distributed manner.

Further, in the present specification, although the preferred embodiments of the present invention have been shown and described, the present invention is not limited to the above-described specific embodiments, those skilled in the art will appreciate that various modifications are possible in the art, without departing from the gist of the invention as disclosed in the accompanying claims, and such modifications should not be understood separately from the technical spirit or scope of the present invention.

What is claimed is:

1. An image display apparatus, comprising:
   a display having an organic light-emitting diode (OLED) panel; and
   a controller to control the display,
   wherein in response to a first input image being a video, when a variation in a level of color information of first pixel data corresponding to a first pixel in the first input image is within a predetermined range, and a level of brightness information of the first pixel data is equal to or greater than a first level for a particular period, the controller detects the first pixel as a pixel in a static area, and decreases the level of brightness of the first pixel data, and
   wherein in response to a second input image being a video, when a level of color information of second pixel data corresponding to a first area in the second input image is changed, a variation in the level of the color information of the second pixel data is outside of the predetermined range, and a brightness difference between the first area and a surrounding area of the first area is equal to or greater than a predetermined value, the controller detects the first area as a non-static area, and does not decrease level of brightness of pixel data in the first area.

2. The image display apparatus of claim 1, wherein the static area comprises a logo area including a logo of a broadcasting station, a broadcasting channel number area, or a program title area in a broadcast video, or a logo area, a title area, or a menu area in an external input video.

3. The image display apparatus of claim 1, wherein in response to the first input image being a video, when for every n-th image frame, the variation in the level of color information in first pixel data corresponding to the first pixel in the first input image is within a predetermined range, and the level of brightness information of the first pixel data is equal to or greater than the first level, the controller detects the first pixel as a pixel in the static area.

4. The image display apparatus of claim 1, further comprising an interface to exchange data with an external server or an external device,
   wherein:
      the interface receives information on the static area in the first input image from the external server or the external device; and
      the controller detects the static area based on the received information on the static area, and in response to the level of brightness information of the first pixel data corresponding to the first pixel in the detected static area being equal to or greater than the first level, the controller detects the first level as a pixel in the static area, and decreases the level of brightness of the first pixel data.

5. The image display apparatus of claim 1, wherein the controller detects the static area, and decreases the brightness level of the detected static area.

6. The image display apparatus of claim 5, wherein as a brightness difference between the detected static area and a surrounding area of the static area becomes larger, the controller further decreases the brightness level of the detected static area.

7. The image display apparatus of claim 5, wherein as the brightness level of the surrounding area of the static area increases, the controller decreases a variation in the brightness level of the static area.

8. The image display apparatus of claim 1, wherein the controller comprises a timing controller which outputs RGBW data to the display.

9. The image display apparatus of claim 8, wherein when changing the brightness level of the first pixel, the controller decreases a brightness level of RGB data of the RGBW data in the first pixel data.

10. The image display apparatus of claim 8, wherein when changing the brightness level of the first pixel data, the controller decreases a brightness level of W data of the RGBW data in the first pixel data.

11. The image display apparatus of claim 1, wherein:
   the controller outputs the RGB data to the display; and
   the display further comprise a timing controller which converts the RGB data into the RGBW data, and outputs the RGBW data to the OLED panel.

12. The image display apparatus of claim 11, wherein when changing the brightness level of the first pixel:
   the controller decreases the brightness level of the RGB data; and
   the timing controller decreases the brightness level of the RGB data of the RGBW data.

13. The image display apparatus of claim 11, wherein:
   when changing the brightness level of the first pixel data, the controller decreases the brightness level of the RGB data in the first pixel data; and when changing the brightness level of the first pixel data, the timing controller decreases the brightness level of the W data of the RGBW data in the first pixel data.

14. The image display apparatus of claim 1, wherein in response to the first pixel data being YRGB data:
the brightness information of the first pixel data corresponds to Y data of the YRGB data; and
the color information of the first pixel data corresponds to RGB data of the YRGB data.

15. The image display apparatus of claim 3, wherein in response to the first pixel data being YCbCr data;
the brightness information of the first pixel data corresponds to Y data of the YCbCr data; and
the color information of the first pixel data corresponds to CbCr data of the YCbCr data.

16. The image display apparatus of claim 5, wherein when a brightness level difference between the lowered brightness level of the detected static area and a brightness level of the surrounding area of the static area is equal to or less than a reference value, the controller further decreases a brightness of an edge area of the detected static area.

17. The image display apparatus of claim 1, wherein the first input image comprises a broadcast video or an external input video received from the external device.

18. An image display apparatus, comprising:
a display having an organic light-emitting diode (OLED) panel; and
a controller to control the display,
wherein when a first input image is a video, the controller determines whether a first pixel is a pixel in a static area based on color information and brightness information of first pixel data corresponding to the first pixel in the first input image;
when the first pixel is the pixel in the static area, the controller decreases a brightness level of the assigned first pixel data, and
wherein in response to a second input image being a video, when a level of color information of second pixel data corresponding to a first area in the second input image is changed, a variation in the level of the color information of the second pixel data is outside of a predetermined range, and a brightness difference between the first area and a surrounding area of the first area is equal to or greater than a predetermined value, the controller detects the first area as a non-static area and does not decrease level of brightness of pixel data in the first area.

19. The image display apparatus of claim 18, further comprising an interface to exchange data with an external server or an external device,
wherein:
the interface receives information on the static area in the first input image from the external server or the external device; and
the controller detects the static area based on the received information on the static area, and determines whether the first pixel is a pixel in the static area based on the color information and the brightness information of the first pixel data corresponding to the first pixel in the detected static area.

20. The image display apparatus of claim 18, wherein:
as a brightness difference between the detected static area and a surrounding area of the static area becomes larger, the controller further decreases the brightness level of the detected static area; and
as a brightness level of the surrounding area of the static area increases, the controller decreases a variation in the brightness level of the static area.

* * * * *